(12) United States Patent
Takano

(10) Patent No.: US 9,590,775 B2
(45) Date of Patent: Mar. 7, 2017

(54) RADIO COMMUNICATION APPARATUS AND RADIO COMMUNICATION METHOD, AND RADIO COMMUNICATION SYSTEM

(71) Applicant: SONY CORPORATION, Minato-ku (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 14 days.

(21) Appl. No.: 14/377,347

(22) PCT Filed: Dec. 26, 2012

(86) PCT No.: PCT/JP2012/083737
§ 371 (c)(1),
(2) Date: Aug. 7, 2014

(87) PCT Pub. No.: WO2013/145489
PCT Pub. Date: Oct. 3, 2013

(65) Prior Publication Data
US 2015/0009845 A1    Jan. 8, 2015

(30) Foreign Application Priority Data

Mar. 29, 2012  (JP) ................................ 2012-076220

(51) Int. Cl.
*H04L 5/00*    (2006.01)
*H04W 52/02*    (2009.01)
(Continued)

(52) U.S. Cl.
CPC .......... *H04L 5/0035* (2013.01); *H04L 5/0048* (2013.01); *H04W 24/08* (2013.01);
(Continued)

(58) Field of Classification Search
CPC ..................................................... H04L 5/0035
(Continued)

(56) References Cited

U.S. PATENT DOCUMENTS 9,119,082 B1\* 8/2015 Gomadam ............... H04B 1/28
9,148,818 B2\* 9/2015 Yue .......................... H04L 5/001
(Continued)

FOREIGN PATENT DOCUMENTS

JP    2010-258612 A    11/2010
JP    2011-61728 A    3/2011
(Continued)

OTHER PUBLICATIONS

International Search Report issued Apr. 2, 2013, in PCT/JP12/083737, filed Dec. 26, 2012.
(Continued)

*Primary Examiner* — Parth Patel
(74) *Attorney, Agent, or Firm* — Chip Law Group

(57) ABSTRACT

Uplink CoMP point selection is achieved, considering power consumption of a MTC device and uplink overhead.
Two resource blocks of a first resource block containing a reference signal and a second resource block for transmitting user data are combined to achieve uplink CoMP. The time interval between these two resource blocks is a time of approximately several milliseconds to several tens milliseconds necessary that each eNodeB acquires reception quality to be collected to a Serving eNodeB via the X2 interface and analyze its content.

19 Claims, 20 Drawing Sheets

(51) Int. Cl.
  *H04W 52/46* (2009.01)
  *H04W 24/08* (2009.01)
  *H04W 48/18* (2009.01)
  *H04B 7/02* (2006.01)
(52) U.S. Cl.
  CPC ... *H04W 52/0206* (2013.01); *H04W 52/0216* (2013.01); *H04W 52/0219* (2013.01); *H04W 52/46* (2013.01); *H04B 7/024* (2013.01); *H04W 48/18* (2013.01)
(58) Field of Classification Search
  USPC .......................................... 370/252, 336, 330
  See application file for complete search history.

(56) References Cited

U.S. PATENT DOCUMENTS

| | | | | | |
|---|---|---|---|---|---|
| 2010/0103555 | A1* | 4/2010 | Lau | ................... | G11B 5/59655 360/77.04 |
| 2010/0309775 | A1* | 12/2010 | Muharemovic | ..... | H04J 13/0062 370/210 |
| 2010/0322171 | A1* | 12/2010 | Dekorsy | .............. | H04B 7/0621 370/329 |
| 2011/0032838 | A1* | 2/2011 | Liu | ....................... | H04L 5/0032 370/252 |
| 2011/0034175 | A1* | 2/2011 | Fong | ..................... | H04B 7/024 455/450 |
| 2011/0038330 | A1* | 2/2011 | Luo | ....................... | H04B 7/024 370/329 |
| 2012/0028665 | A1* | 2/2012 | Kwon | .................. | H04L 1/0002 455/501 |
| 2012/0051265 | A1* | 3/2012 | Shen | ..................... | H04L 5/0035 370/254 |
| 2012/0207076 | A1* | 8/2012 | Suh | ........................ | H04B 7/024 370/312 |
| 2012/0236953 | A1* | 9/2012 | Mueck | ................ | H04W 88/085 375/260 |
| 2013/0088996 | A1* | 4/2013 | Hara | ..................... | H04W 88/06 370/252 |
| 2013/0279344 | A1* | 10/2013 | Wang | ................ | H04W 72/0406 370/241 |
| 2014/0066116 | A1* | 3/2014 | Gao | ....................... | H04W 24/10 455/509 |
| 2014/0226575 | A1* | 8/2014 | Davydov | .............. | H04W 52/04 370/329 |
| 2015/0009924 | A1* | 1/2015 | Takano | ................. | H04L 5/0035 370/329 |
| 2015/0016425 | A1* | 1/2015 | Cui | ........................ | H04B 7/024 370/332 |

FOREIGN PATENT DOCUMENTS

| | | |
|---|---|---|
| JP | 2011-193441 A | 9/2011 |
| WO | 2011-046353 A2 | 4/2011 |
| WO | 2011/155257 | 12/2011 |

OTHER PUBLICATIONS

3GPP TSG RAN1 #67, R1-120325, "SRS enhancements for UL CoMP", Pantech, pp. 1-3, 2012.
3GPP TSG-RAN WG1 #66; Media Tek Inc.; "Point Selection and CSI Feedback for CoMP Operation"; 7.5.2 R1-113051; Zhuhai, China, Oct. 10-Oct. 14, 2011.
Samsung; 3GPP TSG-RAN WG1#66 bis Meeting; "Discussions on TP associations for CoMP"; 7.5.3.1 R1-113092; Zhuhai, China, Oct. 10-14, 2011.
Extended European Search Report issued on Sep. 30, 2015 in patent application No. 12873102.3.

* cited by examiner

RADIO COMMUNICATION APPARATUS AND RADIO COMMUNICATION METHOD, AND RADIO COMMUNICATION SYSTEM

TECHNICAL FIELD

The technology disclosed in the present description relates to a radio communication apparatus and radio communication method, and radio communication system that transmit and receive data simultaneously to and from a terminal in coordination with other base stations, and particularly relates to a radio communication apparatus and radio communication method, and radio communication system that dynamically updates an uplink coordinating group of a plurality of base stations that receive a signal transmitted from a terminal in coordination.

BACKGROUND ART

In 3GPP (Third Generation Partnership Project), the work of standardizing the fourth-generation mobile communications system is currently under way. "LTE (Long Term Evolution)" being one of data communications specifications developed by 3GPP is a long-term advanced system aiming IMT-Advanced that is the fourth-generation (4G), and is also called "3.9G (Super 3G)."

The radio communication system of LTE includes a terminal station (UE: User Equipment) and a base station (eNodeB: evolved Node B) of LTE. Communication from the UE to the eNodeB is called uplink. Communication from the eNodeB to the UE is called downlink.

In addition to a normal terminal that is used directly by a person, such as a conventional mobile phone or PC (Personal Computer), there is also MTC (Machine Type Communication) such as a meter, vending machine, or electronic advertisement as the UE other than the one used directly by a person.

The work of developing the standard of Release 11 related to LTE of 3GPP dealt with CoMP (Coordinated Multi Point Transmission/Reception: coordinated multi point transmission/reception) as a key technology to improve the throughput of a UE located at a cell edge. CoMP is a technology in which a plurality of eNodeBs transmits and receives data simultaneously to and from one UE to promote the reduction of interference from other cells while increasing desired signal power. CoMP includes uplink CoMP in which a plurality of eNodeBs receives data transmitted from a UE in coordination, and downlink CoMP in which a plurality of eNodeBs transmits data to one UE in coordination. Both are important technologies. Moreover, if CoMP is applied to the uplink, low transmit power will do. Accordingly, a UE (among others, a MTC device) is given the effect of reducing power consumption but has a problem in uplink coverage since the transmit power is restricted.

Regarding Decision on CoMP Sets

A combination of eNodeBs that perform CoMP for a certain UE, that is, constitute a coordinating group is hereinafter referred to as the Set of CoMP transmission point, or abbreviated to CoMP set.

In order to decide on the CoMP set, it is necessary to judge which eNodeBs are used to be effective for a UE. This is referred to as decision on the CoMP set, or point selection.

A method in which a UE receives reference signals from base stations, measures RSRP (Reference Signal Received Power) on a base station basis, and selects eNodeBs located at higher ranks as the CoMP set is cited as one of methods for point selection.

Proposed is, for example, a coordinating group setting method in which a base station transmits, to a user terminal, coordinating group setting signaling to which cell IDs of cells in a coordinating group selected for the user terminal are attached, and the user terminal sets the coordinating group with the cell IDs of the cells in the coordinating group selected for the user terminal, the cell IDs having been attached to the coordinating group setting signaling (see, for example, Patent Document 1).

Moreover, proposed is a radio communication method in which a base station allocates parts of the entire frequency band respectively to bands used for single base station transmission (first transmission mode) and multiple base station transmission (second transmission mode), and decides which transmission mode is used based on received feedback information on reception quality of one of the bands, in other words, restricts the feedback information to information on the reception quality of a part of the entire frequency band to reduce the amount of the feedback information (see, for example, Patent Document 2).

Moreover, proposed is a radio communication system in which each base station device receives, from a target terminal device, quality information on the quality of communication with base station devices capable of communicating with the target terminal device, and a base station device acquires schedule information on schedules of communication with terminal devices existing in cells of other base station devices, and selects, based on the quality information and schedule information, some base station devices to cause to function as base stations for the target terminal device (see, for example, Patent Document 3).

Request of Frequency of Point Selection

Point selection is required to be performed at fixed time intervals (in other words, the CoMP set is required to be updated at regular time intervals). In other words, there is a problem that the CoMP set of a UE is updated in a semi-static (Semi-Static) or dynamic (Dynamic) manner. Considering a temporal change in communication environment such as the movement of the UE, dynamic point selection to dynamically update the CoMP set is desired.

Basic Matters to be Considered in Dynamic Point Selection

If dynamic point selection is performed, it is necessary to consider a reduction in throughput due to the occupation of a reference signal in a communication sequence in the system, in other words, downlink overhead due to the reference signal.

Moreover, it is necessary to consider an increase in power consumption of the UE due to the UE's frequent measurements of the reference signal, and the like. Above all, if the UE is a MTC device, there is a request to reduce the cost of manual battery change and accordingly extremely low power consumption is required (which is described later).

Furthermore, it is also necessary to consider an increase in uplink overhead due to the feedback of the measurement result of the reference signal from the UE to the eNodeB.

In downlink CoMP, it is desired to perform dynamic point blanking. The reason is to avoid a reduction in the throughput of the entire system due to an increase in interference by an unnecessary eNodeB emitting unnecessary radio waves.

On the other hand, in dynamic point blanking in uplink CoMP, there is surely no problem in unnecessary emission since it is about reception on the eNodeB side. However, there is a problem that it is necessary to keep a resource block empty for another UE that is attempting to perform uplink transmission targeting the resource block, and unnecessary reception on the eNodeB side is not desired. The problem of the resource block appears as a phenomenon of a reduction in the throughput of the entire system in the end.

Therefore, it is also desired in uplink CoMP to reduce the eNodeB's unnecessary reception by performing dynamic point blanking.

CITATION LIST

Patent Document

Patent Document 1: JP 2011-193441 A
Patent Document 2: JP 2011-61728 A
Patent Document 3: JP 2010-258612 A

SUMMARY OF THE INVENTION

Problems to be Solved by the Invention

An object of the technology disclosed in the present description is to provide an excellent radio communication apparatus and radio communication method, and radio communication system that can suitably update an uplink coordinating group of a plurality of base stations that receive a signal transmitted from a terminal in coordination.

Another object of the technology disclosed in the present description is to provide an excellent radio communication apparatus and radio communication method, and radio communication system that can suitably update an uplink coordinating group considering downlink overhead with the transmission of a reference signal to a terminal, an increase in the power consumption of the terminal with the measurement of the reference signal, and uplink overhead with the feedback of the measurement result of the reference signal from the terminal.

Solutions to Problems

The present application was made in view of the above problem, and the technology according to claim 1 is a radio communication apparatus to operate as a terminal station, the radio communication apparatus including:

a reference signal transmission unit for transmitting a reference signal to be measured to decide on a coordinating group of base stations that perform coordinated multi point reception, using a first radio resource allocated to the radio communication apparatus; and a user data transmission unit for transmitting user data using a second radio resource allocated to the radio communication apparatus, the second radio resource being separated by a predetermined time interval from the first radio resource.

According to the technology of claim 2 of the present application, in the radio communication apparatus according to claim 1, the first and second radio resources are reserved in between with at least one base station that performs coordinated multi point reception.

According to the technology of claim 3 of the present application, in the radio communication apparatus according to claim 1, there is a sufficient time interval between the first and second radio resources to decide on the coordinating group based on results of measuring, at base stations, the reference signal from the reference signal transmission unit.

According to the technology of claim 4 of the present application, in the radio communication apparatus according to claim 1, the reference signal transmission unit transmits the reference signal that is not precoded.

According to the technology of claim 5 of the present application, in the radio communication apparatus according to claim 1, the reference signal transmission unit transmits the reference signal using a time domain of a part of the first radio resource.

According to the technology of claim 6 of the present application, in the radio communication apparatus according to claim 1, the reference signal transmission unit transmits the reference signal using a frequency domain of a part of the first radio resource.

According to the technology of claim 7 of the present application, in the radio communication apparatus according to claim 1, the reference signal transmission unit transmits the reference signal multiplexed in coordination with other terminal stations in at least one of time and frequency directions in the first radio resource.

Further, the technology according to claim 8 of the present invention is a radio communication apparatus to operate as a base station, the radio communication apparatus including:

a quality evaluation unit for measuring a reference signal transmitted from a terminal station using a first radio resource, and evaluating the quality of a channel;

a measurement result receiving unit for receiving measurement results of the reference signal at other base stations being candidates for a coordinating group that performs coordinated multi point reception for the terminal station;

a decision unit for deciding on base stations to form the coordinating group from the other candidate base stations based on the measurement results received by the measurement result receiving unit; and a decoding unit for synthesizing received signals by the coordinating group, the signals being user data transmitted by the terminal station in a second radio resource separated by a predetermined time interval from the first radio resource.

According to the technology of claim 9 of the present application, the radio communication apparatus according to claim 8 further includes a rescheduling unit for reallocating a radio resource in a cell of the radio communication apparatus upon having decided not to perform coordinated multi point reception for the terminal station.

According to the technology of claim 10 of the present application, in the radio communication apparatus according to claim 8, the first and second radio resources are reserved between the radio communication apparatus and the terminal station.

According to the technology of claim 11 of the present application, in the radio communication apparatus according to claim 8, there is a sufficient time interval between the first and second radio resources to decide on the coordinating group based on results of measuring, at base stations, the reference signal from the reference signal transmission unit.

According to the technology of claim 12 of the present application, in the radio communication apparatus according to claim 8, the decision unit decides on base stations to form the coordinating group based on the measurement results of the reference signal transmitted using a time domain of a part of the first radio resource.

According to the technology of claim 13 of the present application, in the radio communication apparatus according to claim 8, the decision unit decides on base stations to form the coordinating group based on the measurement results of the reference signal transmitted using a frequency domain of a part of the first radio resource.

According to the technology of claim 14 of the present application, in the radio communication apparatus according to claim 8, the decision unit decides on base stations to form the coordinating group based on the measurement results of the reference signal multiplexed in coordination with other terminal stations in at least one of time and frequency directions in the first radio resource.

Further, the technology according to claim 15 of the present application is a radio communication apparatus to operate as a base station, the radio communication apparatus including:

a quality evaluation unit for measuring a reference signal transmitted from a terminal station using a first radio resource, and evaluating the quality of a channel;

a measurement result transmission unit for transmitting the measurement result by the quality evaluation unit to a serving base station to decide on base stations to form a coordinating group that performs coordinated multi point reception for the terminal station; and a received signal transmission unit for upon having been decided by the serving base station that the radio communication apparatus joins the coordinating group, transmitting, to the serving base station, a received signal of user data transmitted by the terminal station in a second radio resource separated by a predetermined time interval from the first radio resource.

According to the technology of claim 16 of the present application, the radio communication apparatus according to claim 15 further includes a rescheduling unit for reallocating a radio resource in a cell of the radio communication apparatus upon having been decided that the radio communication apparatus does not join the coordinating group.

According to the technology of claim 17 of the present application, in the radio communication apparatus according to claim 15, the first and second radio resources are reserved between the serving base station and the terminal station.

According to the technology of claim 18 of the present application, in the radio communication apparatus according to claim 15, wherein there is a sufficient time interval between the first and second radio resources to decide on the coordinating group based on results of measuring, at base stations, the reference signal from the reference signal transmission unit.

According to the technology of claim 19 of the present application, in the radio communication apparatus according to claim 15, the quality evaluation unit measures the reference signal transmitted using a time domain of a part of the first radio resource, and evaluates the quality of the channel.

According to the technology of claim 20 of the present application, in the radio communication apparatus according to claim 15, the quality evaluation unit measures the reference signal transmitted using a frequency domain of a part of the first radio resource, and evaluates the quality of the channel.

According to the technology of claim 21 of the present application, in the radio communication apparatus according to claim 15, the quality evaluation unit measures the reference signal multiplexed in coordination with other terminal stations in at least one of time and frequency directions in the first radio resource, and evaluates the quality of the channel.

Further, the technology according to claim 22 of the present application is a radio communication method to operate as a terminal station, the radio communication method including:

a reference signal transmission step of transmitting a reference signal to be measured to decide on a coordinating group of base stations that perform coordinated multi point reception, using a first radio resource allocated to the terminal station; and a user data transmission step of transmitting user data using a second radio resource allocated to the terminal station, the second radio resource being separated by a predetermined time interval from the first radio resource.

Further, the technology according to claim 23 of the present application is a radio communication method to operate as a base station, the radio communication method including:

a quality evaluation step of measuring a reference signal transmitted from a terminal station using a first radio resource, and evaluating the quality of a channel;

a measurement result receiving step of receiving measurement results of the reference signal at other base stations being candidates that perform coordinated multi point reception for the terminal station;

a decision step of deciding on base stations to form a coordinating group that performs coordinated multi point reception for the terminal station in coordination with the base station from the other candidate base stations based on the measurement results received in the measurement result receiving step; and a decoding step of synthesizing received signals by the coordinating group, the signals being user data transmitted by the terminal station in a second radio resource separated by a predetermined time interval from the first radio resource.

Further, the technology according to claim 24 of the present application is a radio communication method to operate as abase station, the radio communication method including:

a quality evaluation step of measuring a reference signal transmitted from a terminal station using a first radio resource, and evaluating the quality of a channel;

a measurement result transmission step of transmitting the measurement result in the quality evaluation step to a serving base station to decide on base stations to form a coordinating group that performs coordinated multi point reception for the terminal station; and a received signal transmission step of upon having been decided by the serving base station that the base station joins the coordinating group, transmitting, to the serving base station, a received signal of user data transmitted by the terminal station in a second radio resource separated by a predetermined time interval from the first radio resource.

Further, the technology according to claim 25 of the present application is a radio communication system including:

a terminal station for transmitting a reference signal using a first radio resource, and transmitting user data using a second radio resource separated by a predetermined time interval from the first radio resource; and a plurality of base stations for each measuring the reference signal and forming a coordinating group based on the measurement results of the reference signal to perform coordinated multi point reception on the user data.

However, the "system" mentioned here indicates a logical aggregation of a plurality of apparatuses (or functional modules to achieve specific functions). Whether or not each apparatus or functional module is in a single housing is not particularly defined.

Effects of the Invention

The technology disclosed in the present description can provide an excellent radio communication apparatus and radio communication method, and radio communication system that can suitably update an uplink coordinating group, considering downlink overhead with the transmission of a reference signal to a terminal, an increase in the power consumption of the terminal with the measurement of the reference signal, and uplink overhead with the feedback of the measurement result of the reference signal from the terminal.

Another object, features, and advantages of the technology disclosed in the present description will be clear from a more detailed explanation based on embodiments described below and the accompanying drawings.

MODES FOR CARRYING OUT THE INVENTION

Hereinafter, embodiments of the technology disclosed in the present description is explained in detail with reference the drawings.

Figure 16:
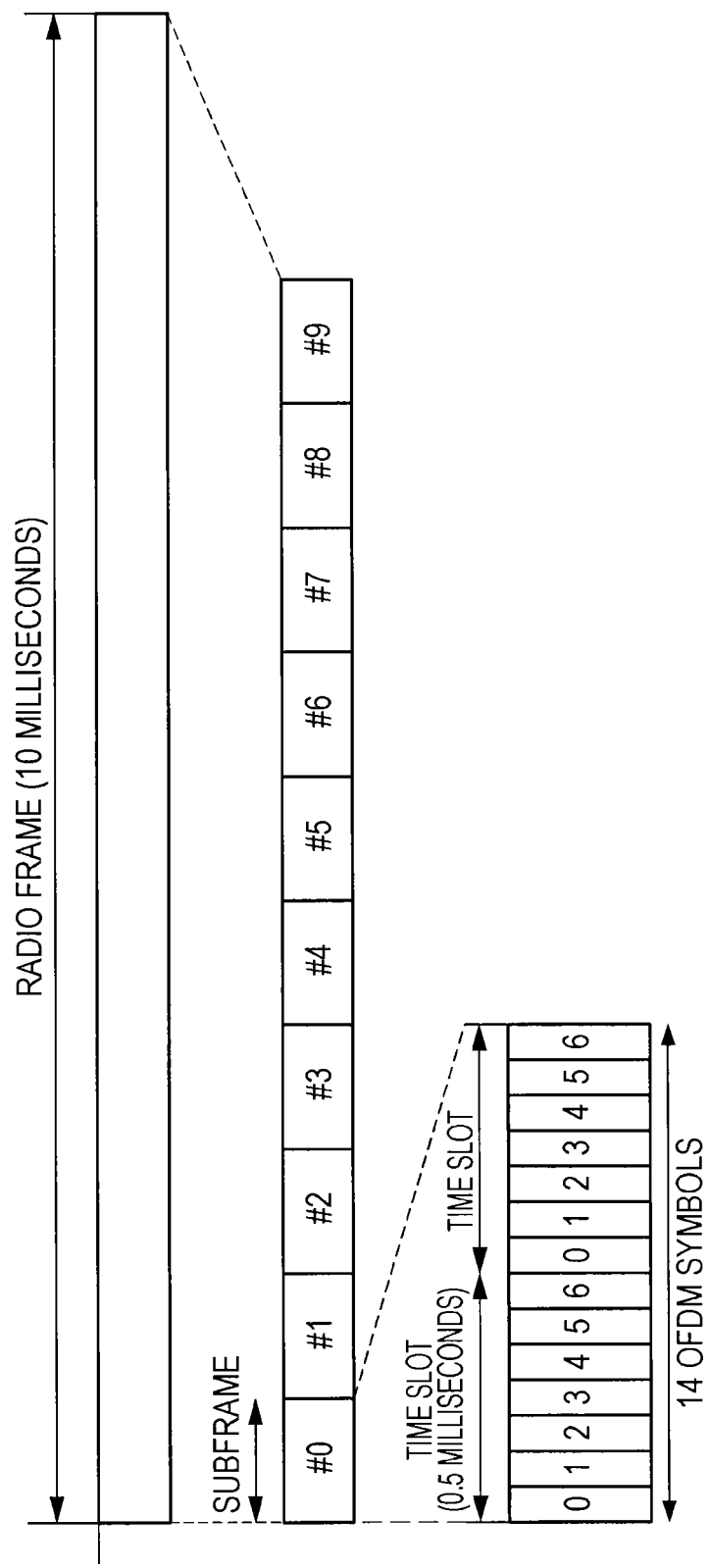
FIG. 16 is a diagram illustrating a downlink radio frame configuration of LTE.

In LTE, a communication method is based on the OFDM modulation scheme, and OFDMA is adopted as a downlink radio access method. FIG. 16 illustrates a downlink radio frame configuration of LTE. As illustrated, a radio frame is divided into three layers of a time slot (Slot), a subframe (Subframe), and a radio frame (Radio Frame) in the order of shorter time units.

A time slot having a length of 0.5 milliseconds is comprised of seven OFDM symbols (however, in the case of normal unicast transmission), and serves as a unit of a demodulation process upon reception on a user (UE) side. A subframe having a length of 1 millisecond is comprised of two consecutive time slots (14 OFDM symbols), and serves as a transmission time unit of one data packet to which error coding has been applied. A radio frame having a length of 10 milliseconds is comprised of 10 consecutive subframes (that is, 20 time slots), and serves as a basic unit of multiplexing onto all physical channels. The subframe is divided into parts of a control region PDCCH used as a control signal from an eNodeB, and a data region PDSCH used as user data.

Users can communicate without interfering with each other if different subcarriers or time slots are used. In LTE, consecutive subcarriers are blocked, and a minimum unit of radio resource allocation called "resource block (RB)" is defined. A scheduler mounted on a base station (eNodeB) allocates radio resources to the users on a resource block basis. A resource block is comprised of 12 subcarriers×1 time slot (7 OFDM symbols=0.5 milliseconds). Moreover, up to the first three OFDM symbols in a subframe are used for the control channel, that is, PDCCH. The scheduler of the base station can allocate resource blocks on a subframe basis, that is, at intervals of 1 millisecond. The location information of resource blocks is called scheduling. Uplink scheduling information and downlink scheduling information are both described in the downlink control channel. Each user can recognize a resource block allocated to the user, checking the control channel.

A time slot of 0.5 milliseconds is the minimum unit of allocation that can be used by each user. The scheduler mounted on the base station (eNodeB) allocates, to the users, available time slots on a time slot basis. In LTE, two communication methods of FDD (Frequency Division Duplex) and TDD (Time Division Duplex) can be selected. In the case of TDD, it is possible to select, on a subframe basis, the uplink or downlink for which TDD is used.

If CoMP is applied to a data communications system in conformity with LTE, it is important to configure a CoMP set including the necessary minimum number of eNodeBs that satisfy the quality necessary to the UE. Moreover, considering the movement of the UE, dynamic point selection to dynamically update the CoMP set is desired. When point selection is updated, it is necessary to consider a reduction in throughput due to the occupation of a reference signal in a communication sequence in the system, an increase in uplink overhead caused by the UE feeding back the measurement result of the reference signal to the eNodeB, and further an increase in the power consumption of the UE with the measurement of the reference signal and the feedback of the measurement result.

Methods for configuring cells to achieve CoMP include a method in which a plurality of eNodeBs respectively performs autonomous distributed control and a method in which one eNodeB centrally controls a plurality of other eNodeBs.

Figure 1:
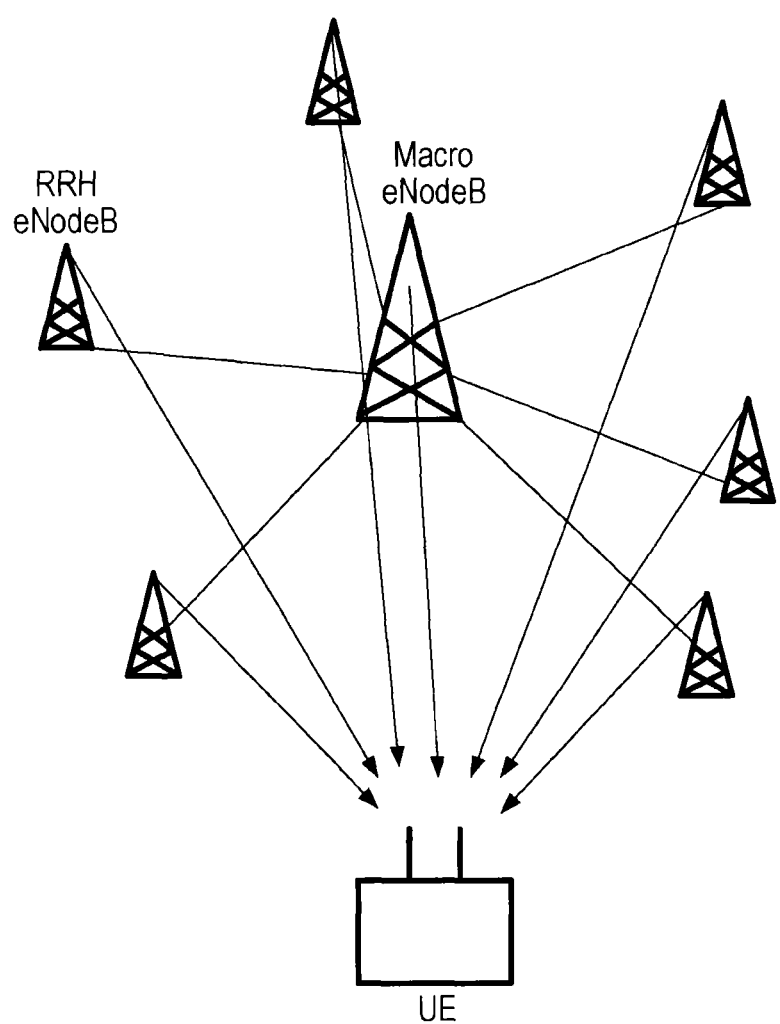
FIG. 1 is a diagram schematically illustrating a mode in which a Macro eNodeB and a plurality of RRHs subordinate to the Macro eNodeB are connected.

FIG. 1 illustrates a configuration example of a radio communication system according to an example of the latter centralized control method. The illustrated radio communication system includes a Macro eNodeB and a plurality of RRHs (Remote Radio Heads) subordinate to the Macro eNodeB. RRHs are placed at cell edges or the like as a measure for blind areas. The X2 interface configured of optical fibers connects the Macro eNodeB and each RRH (or Pico eNodeB) with baseband signals. The Macro eNodeB processes and controls the baseband signals of the RRHs to collectively control radio resources between cells. The Macro eNodeB and one or more RRHs transmit/receive data simultaneously to/from one UE to perform CoMP. Mainly the Macro eNodeB operates as a Serving eNodeB.

Regarding Reference Signals

Reference signals to be used for downlink measurement, the reference signals being transmitted from the eNodeB, include CRS and CSI-RS.

Figure 17:
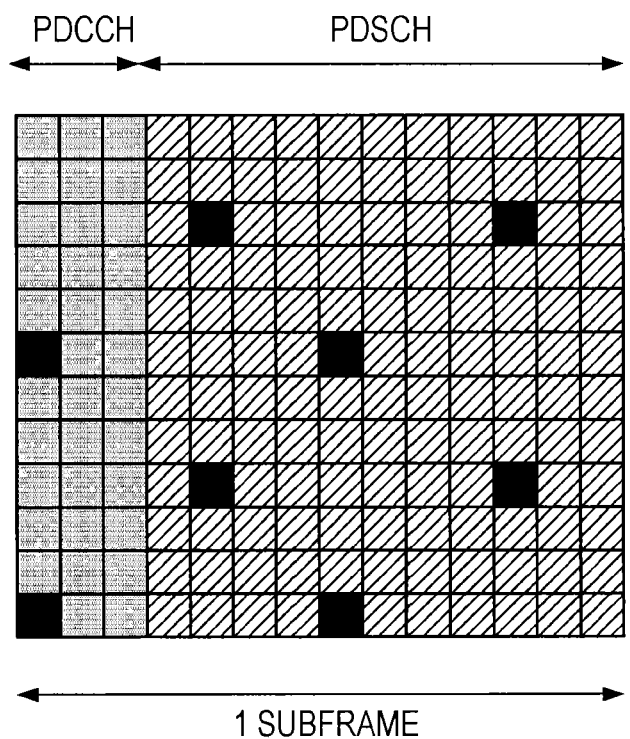
FIG. 17 is a diagram illustrating a state where CRSs are inserted in a subframe.

CRS (Cell-specific Reference Signal) is a reference signal to be inserted in a downlink subframe, and was introduced in Release 8 being the initial version of LTE. FIG. 17 illustrates a state where CRSs are inserted in a subframe. In the illustrated example, up to the first three OFDM symbols are PDCCH, and the fourth and later OFDM symbols are PDSCH. In the figure, the resource element parts filled in black correspond to a CRS signal, but CRSs are inserted in both regions of the PDCCH and PDSCH.

CRS is transmitted from the eNodeB even if the user data of the PDSCH is not transmitted from the eNodeB. This is because the UE is assumed to always use CRS for synchronization acquisition and channel estimation in between with the eNodeB, quality measurement of the eNodeB, and the like.

CRS uses the same location (in other words, the same resource element in the frequency and time directions) among eNodeBs (in FIG. 17, the eNodeBs use the common resource elements filled in black as the locations to insert CRSs). Hence, it is necessary to guarantee orthogonality among the eNodeBs, and therefore a signal having a different sequence is used for CRS on an eNodeB basis. There are 504 sequences in total. If the Cell ID of an eNodeB is different, the sequence of CRS is also different. It is called Cell Specific reference signal, Cell-specific Reference Signal, meaning to be specific to each cell.

Moreover, CSI-RS (Channel State Information Reference Signal) is a reference signal contained in a downlink signal, but is not contained in all subframes but inserted in fixed periods. For example, CSI-RS can be set to be transmitted in one subframe, once in 5 to 80 milliseconds. The setting of the period can semi-statically be changed by RRC (Radio Resource Control: radio link control connection) Signaling.

CSI-RS is a reference signal newly introduced in Release 10 of 3GPP. CSI-RS is also a signal specific to each cell and can be said to be Cell-specific. The locations of resource elements in which CSI-RSs are inserted in a subframe can also be changed by the setting. A sequence for improving orthogonality between the eNodeBs is prepared also for a signal to be inserted.

As described above, the transmission period can be set between 5 milliseconds and 80 milliseconds. Accordingly, CRS-RS has a large advantage that the overhead occupied by a reference signal can be reduced. Moreover, even eNodeBs having the same Cell ID can allocate CSI-RSs to different locations. As in the case of achieving CoMP by the centralized control method, even if the same Cell ID is allocated to a plurality of Pico eNodeBs such as RRHs, the UE can discriminate between the RRHs to make measurements as long as CSI-RSs are set separately.

In the TDD mode, the uplink and downlink channels are reversible. Accordingly, uplink dynamic point selection can be performed based on the measurement result of the downlink reference signal such as CRS or CSI-RS. However, in the FDD mode, the uplink and downlink channels are irreversible. Accordingly, the downlink reference signal is not suitable to acquire the state of the uplink channel. In other words, it is difficult to accurately perform uplink dynamic point selection from the measurement result of the downlink reference signal.

On the other hand, reference signals to be used for uplink measurement, the reference signals being transmitted from the UE side, include SRS, Uplink DMRS, and the like.

SRS (Sounding Reference Signal) is a reference signal contained in an uplink subframe, and was introduced in Release 8 of 3GPP. With SRS, the state of an uplink channel can be acquired with little overhead. Therefore, the eNodeB acquires the state of the uplink channel based on SRS and uses the state of the uplink channel as information for scheduling. Moreover, when uplink point selection is performed, SRS is important.

Figure 18:
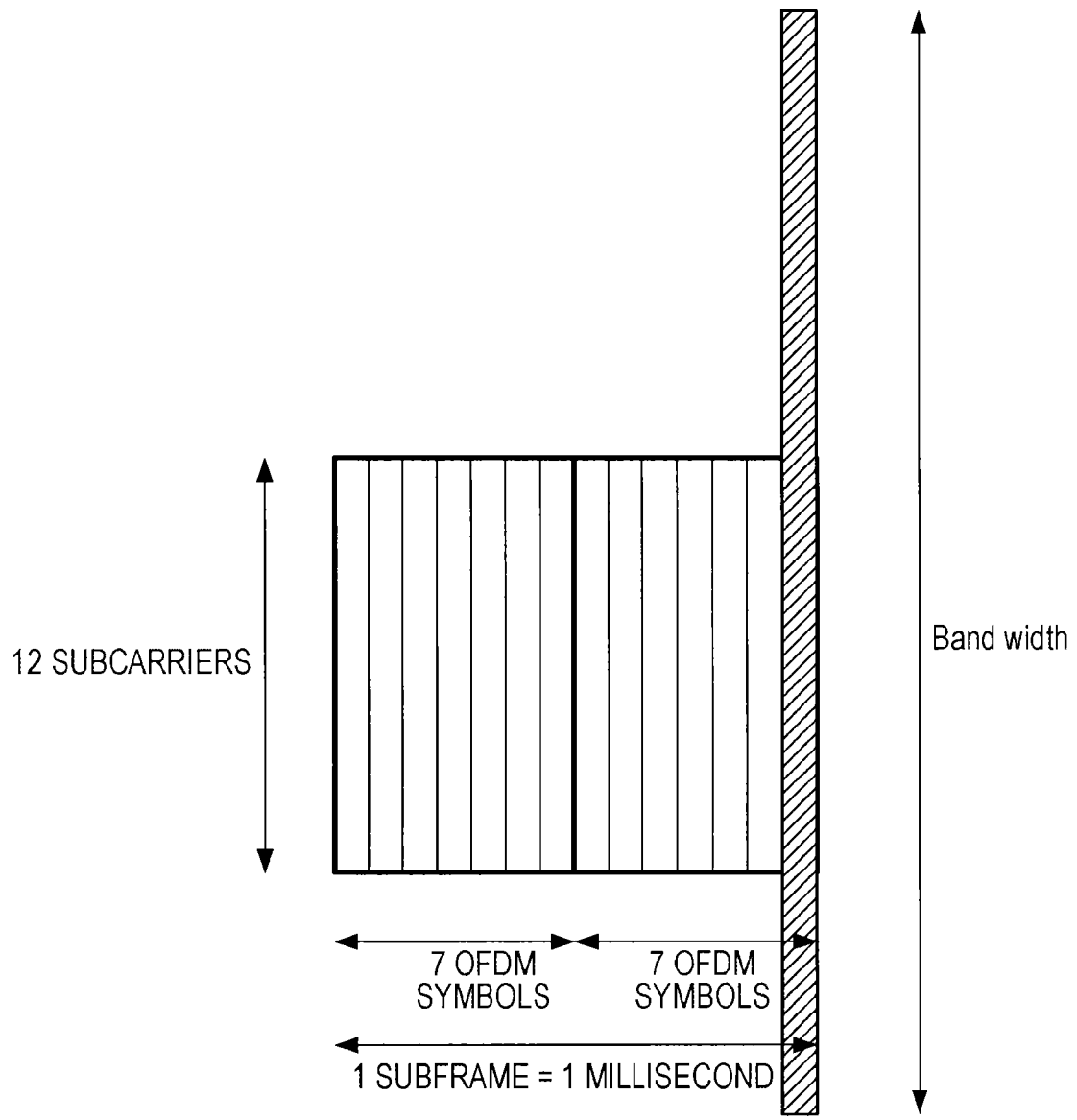
FIG. 18 is a diagram illustrating a state where SRS is inserted over the entire frequency domain of the last OFDM symbol in a subframe.

SRS is inserted not only in a part (for example, 12-subcarrier long) where a resources block has been allocated to the terminal, the part being the last OFDM symbol of 14 OFDM symbols in a relevant subframe, but over the entire frequency domain (Band width) of a system bandwidth (see a region indicated by oblique lines in FIG. 18). The SRS insertion period can be changed from 2 to 160 milliseconds. The SRSs of the UEs are multiplexed by using different sequences. Focusing on one subframe, the SRSs of the UEs in which the periods are overlapping are transmitted in the same slot, but the sequences are different. Accordingly, the channels in between with the UEs can be separated and acquired on the eNodeB side.

SRS allows the acquisition of the uplink state with relatively little overhead. However, the overhead is slightly large for the MTC device. Hence, the present applicant considers that it is not suitable for the MTC device to transmit SRS for the purpose of uplink dynamic point selection.

Figure 19:
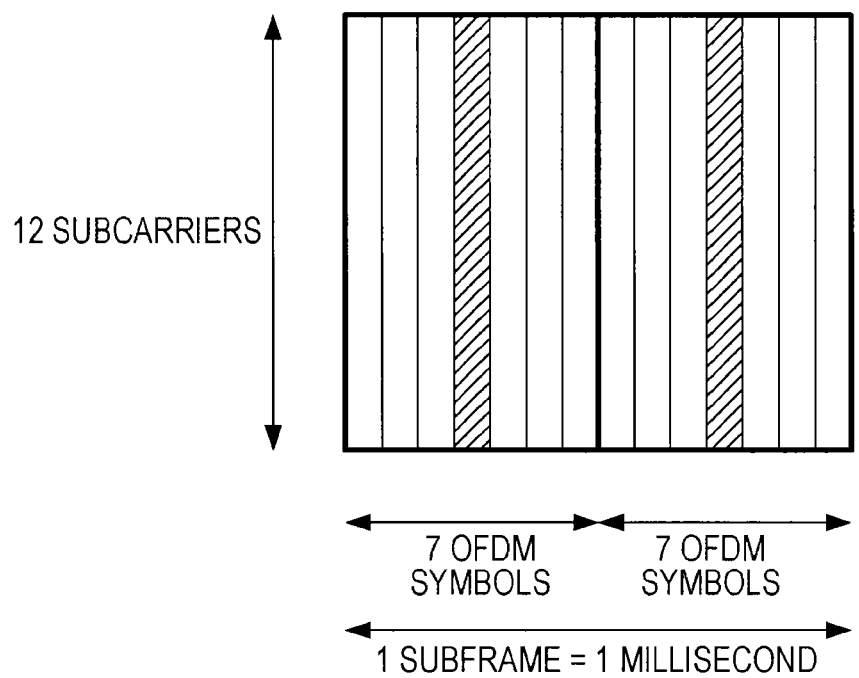
FIG. 19 is a diagram illustrating a DMRS structure.

Moreover, Uplink DMRS (DeModulation Reference Signal) is a reference signal for performing coherent detection. FIG. 19 illustrates a DMRS structure. As indicated by oblique lines in the figure, a central OFDM symbol in a time slot of 0.5 milliseconds is used to transmit DMRS.

In precoding used in the MTC device, multiplication is done without discriminating between DMRS and the other part. If they are multiplied by the multiplier of the precoding, it is not suitable to acquire the natural state of the channel (the original state of the channel) from the measurement result of DMRS on the receiving eNodeB side. In other words, DMRS is not suitable for measurement for the purpose of uplink dynamic point selection. However, the number of antennas of the MTC terminal is highly likely to be one. If it is DMRS transmitted from the MTC device with one antenna, it can be a candidate for a reference signal suitable to acquire the natural state of the channel.

However, DMRS is a reference signal to be required upon uplink data transmission. Accordingly, unlike SRS that can be transmitted even when data is not transmitted, attention needs to be given to its handling.

Purpose of Measuring Reference Signals

The measurement of reference signals can generally be used for various purposes. A first purpose is that a UE searches for an eNodeB being a handover destination. When the quality of a Serving eNodeB is deteriorated, the UE makes measurements of eNodeBs in neighboring cells to search for an eNodeB of the next handover destination. A second purpose is to acquire the quality of a channel. This is because the value (weighting factor of an antenna for beamforming) of precoding to be used on the eNodeB side upon downlink transmission is decided and radio resources are assigned to UEs by the scheduler of the eNodeB. Hence, reference signals are measured. In the technology disclosed in the present description, to obtain necessary information for point selection is added as a new purpose of measuring reference signals. Moreover, it is considered that the UE feeds back information that can be a source to decide on the CoMP set on the eNodeB side, in addition to the measurement result of the reference signal.

Uplink Data Structure

Figure 20:
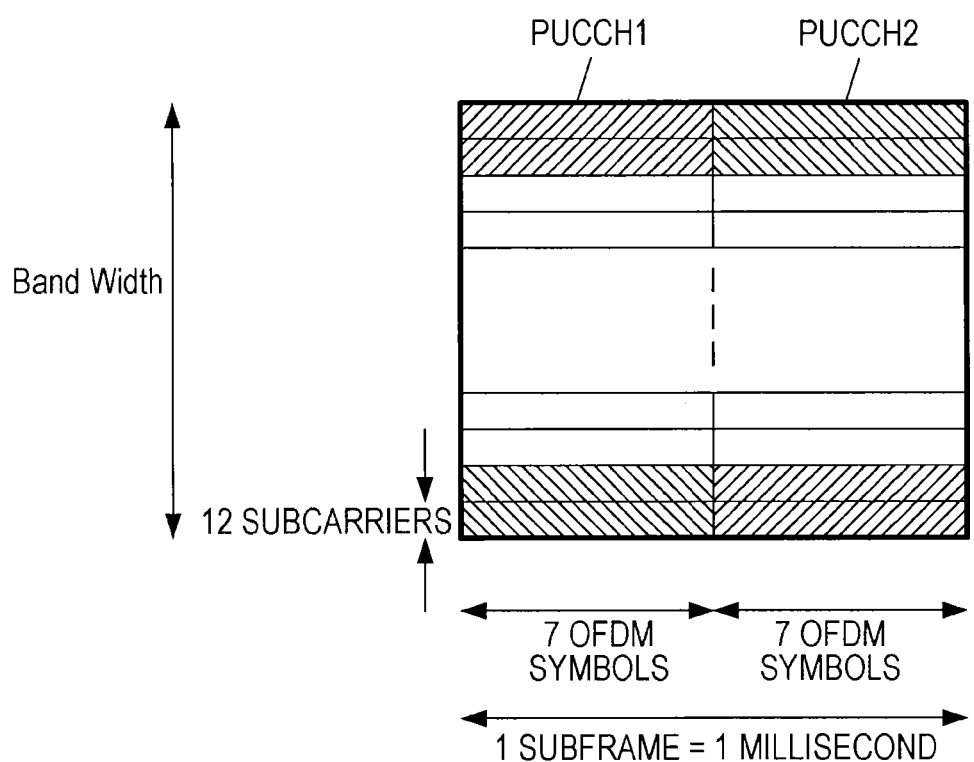
FIG. 20 is a diagram illustrating an uplink data structure.

Each subframe constituting an uplink radio frame includes a control signal PUCCH (Phy Uplink Control Channel) to an eNodeB, and PUSCH (Phy Uplink Shared Channel) used as user data. FIG. 20 illustrates an uplink data structure. As indicated by left and right oblique lines in the figure, PUCCH is designed to transmit the same control data PUCCH1 and PUCCH2 in a crosswise structure at both ends of the bandwidth to use and obtain diversity gain on the receiving side. When the PUUCHs of a plurality of UEs are transmitted, the control data regions at both ends are increased. Moreover, the user data PUSCH is transmitted using a region except the control data parts at both ends (a white region in FIG. 20). A resource block is comprised of 12 subcarriers×1 time slot (7 OFDM symbols=0.5 milliseconds) as in the downlink.

Request to MTC

MTC (Machine Type Communication) is a synonym for a technology generally called M2M (Machine to Machine), and indicates communication between machines. A MTC device is requested to reduce the cost of the manual battery change. Accordingly, extremely low power consumption is required. In short, a system is required which can transmit and receive radio waves for approximately 10 years with one battery under the condition of no battery change.

In order to reduce power consumption of MTC, it is necessary to reduce communication opportunities in both the uplink and downlink. Especially in the uplink, the MTC device injects electric power directly into a power amplifier to transmit radio waves and accordingly if the power is increased for the transmission, battery exhaustion is severe. Therefore, it is necessary to keep the transmit power for the uplink to a fixed value or below. However, if the transmit power is suppressed, there arises a problem whether or not the eNodeB can receive a signal from the MTC device.

As described above, a reduction in the transmit power of the MTC device is important to reduce the power consumption of the MTC device. For example, it is considered that the use of uplink CoMP achieves a reduction in the transmit power of the MTC device. Uplink signals are received by a plurality of antennas of a plurality of eNodeBs. Therefore, the reception quality can be improved, and the transmit power of the MTC device can be reduced accordingly.

Figure 2:
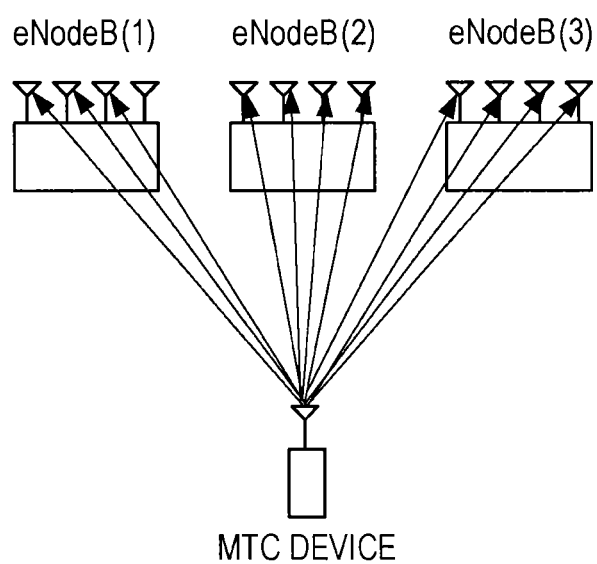
FIG. 2 is a diagram schematically illustrating a configuration of 1:n MIMO of when a MTC device uses CoMP for uplink.

Moreover, the MTC device is required to reduce the device cost and accordingly an RF part for transmission and reception is assumed to be one. Two or more RF parts may be mounted to obtain diversity gain. However, it is basically considered to be one. Therefore, uplink MIMO is configured to be 1:n. When uplink CoMP is used, n denotes the total of a plurality of antennas of a plurality of eNodeBs constituting CoMP. Therefore, since the configuration of MIMO is 1:n, there is no load of the antenna signal processing on the MTC device side. The entire antenna signal processing is performed on the eNodeB side. FIG. 2 schematically illustrates a configuration of 1:n MIMO of when the MTC device uses CoMP for the uplink.

The MTC device is highly likely to perform CoMP in the uplink but not in the downlink. This is based on: that in uplink CoMP, the device is required to have one antenna, and the loads of the antenna signal processing and the like are small on the device side; and a request to expand uplink coverage. The coverage mentioned here indicates an area where a signal from the MTC device reaches the eNodeB.

Consider point selection in the case where the MTC device performs uplink CoMP.

In order to enhance uplink coverage, the MTC device is requested to reduce power consumption although CoMP only in the uplink is important.

It is necessary to acquire the state of the uplink channel for uplink point selection. The state of the channel can be acquired by measuring a reference signal. However, candidates for usable reference signals include four kinds of conventional CRS, CSI-RS, SRS, and Uplink DMRS.

There is a problem that if downlink reference signals such as CRS and CSI-RS are frequently measured for uplink point selection, the power consumption of the MTC device is increased. This is because there is a need to make measurements on the MTC device side by the number of eNodeBs being candidates for CoMP. Moreover, in the FDD mode, the channel is not reversible between the uplink and downlink. Hence, even if the downlink reference signal is measured, the state of the uplink channel may not be able to be acquired accurately so that accurate point selection may not be able to be performed.

On the other hand, if uplink reference signals such as SRS and Uplink DMRS are used to make measurements for uplink point selection on the eNodeB side, attention needs to be given to a fact that power consumption is increased since the MTC device transmits the reference signal. Especially, in terms of SRS, the reference signal needs to be transmitted not only in a part where a resource block has been allocated to the device but over the entire frequency domain (see FIG. 18). The load of transmit power is an issue for the MTC device. In the first place, the MTC device may be configured to be unable to transmit a signal only through a part of the frequency domain from the viewpoint of low cost design.

Normal Periodical SRS is transmitted at regular intervals of 2 to 160 milliseconds. SRS is transmitted using the entire frequency domain of the last OFDM symbol in a subframe. Accordingly, it is ineffective for the MTC device.

Moreover, Uplink DMRS is a reference signal to perform coherent detection and is transmitted by being multiplied by precoding on the UE side. Accordingly, Uplink DMRS is not desired to make a measurement of the channel itself.

In other words, the present applicant considers that any of four kinds of conventional reference signals of CRS, CSI-RS, SRS, and Uplink DMRS is not suitable to be used for measurement for uplink CoMP point selection by the MTC device.

Hence, the applicant explains below some embodiments that can make measurements suitably for uplink CoMP point selection of the MTC device, considering the power consumption of the MTC device and uplink overhead.

First Embodiment

A first embodiment is based on that a MTC device transmits a reference signal, using a previously reserved resource block between an eNodeB and the MTC device. A resource block can be reserved between the eNodeB and the UE using, for example, RRC Signaling.

An eNodeB that decides on an eNodeB used for uplink CoMP is referred to as the "Serving eNodeB." The Serving eNodeB decides on eNodeBs to use for uplink CoMP using the measurement results of reference signals by a plurality of eNodeBs being candidates to join CoMP. The Serving eNodeB itself may join CoMP. An eNodeB, other than the Serving eNodeB, that passes its own measurement result of the reference signal to the Serving eNodeB is referred to as the "cooperating eNodeB." The X2 interface configured of optical fibers is used to connect the Serviing eNodeB and the cooperating eNodeB with baseband signals.

A time to decide on an eNodeB to be used for uplink CoMP is required between after each eNodeB's execution of the measurement of an uplink reference signal from the MTC device, and the start of CoMP reception. Hence, in the first embodiment, a time interval is placed between the uplink reference signal and uplink user data. In other words, uplink CoMP is achieved by combining two resource blocks of a first resource block containing the reference signal and a second resource block transmitting the user data. The time interval between these two resource blocks should be decided based on a time necessary that each eNodeB acquires reception quality to be collected to the Serving eNodeB via the X2 interface and analyze its content. However, several milliseconds or several tens milliseconds is considered to be sufficient.

Figure 3:
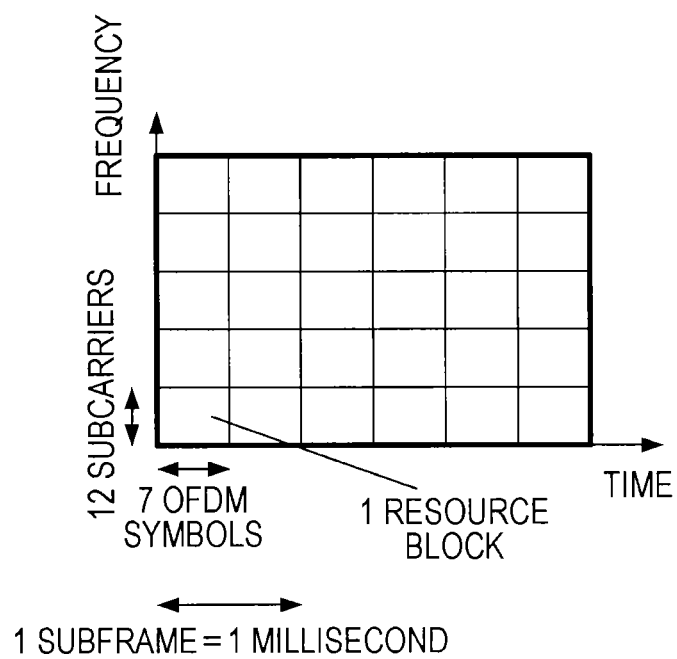
FIG. 3 is a diagram illustrating a state of configuring a sub-band by binding a plurality of resource blocks.

An uplink resource block is comprised of 12 subcarriers×1 time slot (7 OFDM symbols=0.5 milliseconds) as in the downlink. FIG. 3 illustrates a state of configuring a sub-band by binding a plurality of resource blocks.

Figure 4:
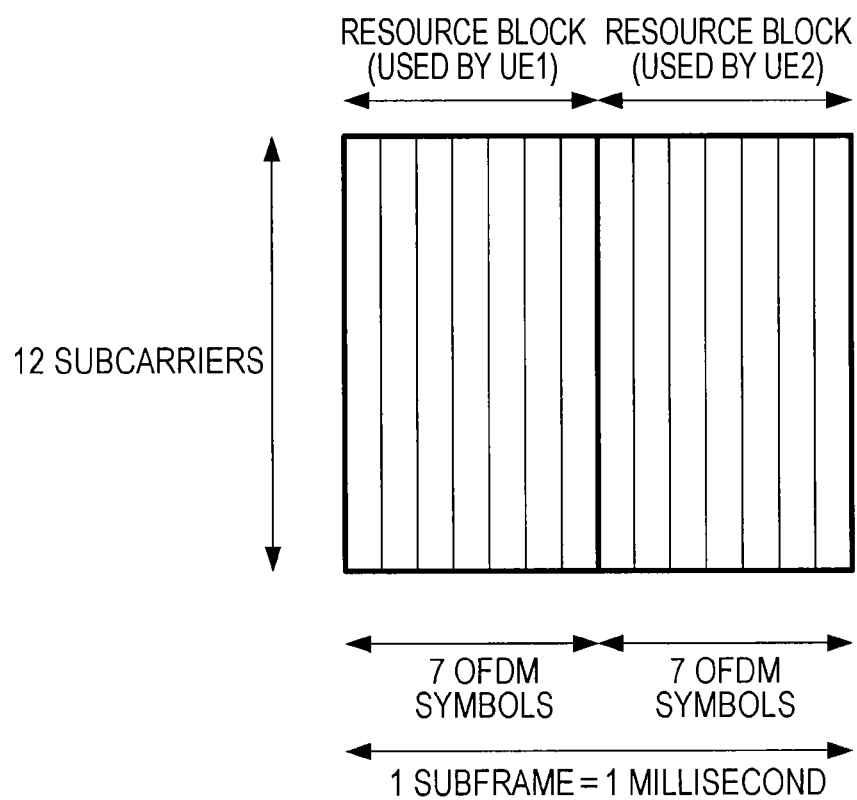
FIG. 4 is a diagram illustrating a state where UEs use resource blocks.

A resource block is a minimum unit of resource to be used by a UE. Therefore, one UE fully uses one resource block. FIG. 4 illustrates a state where a terminal UE1 uses a resource block containing the first seven OFDM symbols in one subframe and a terminal UE2 uses a second resource block.

Figure 5:
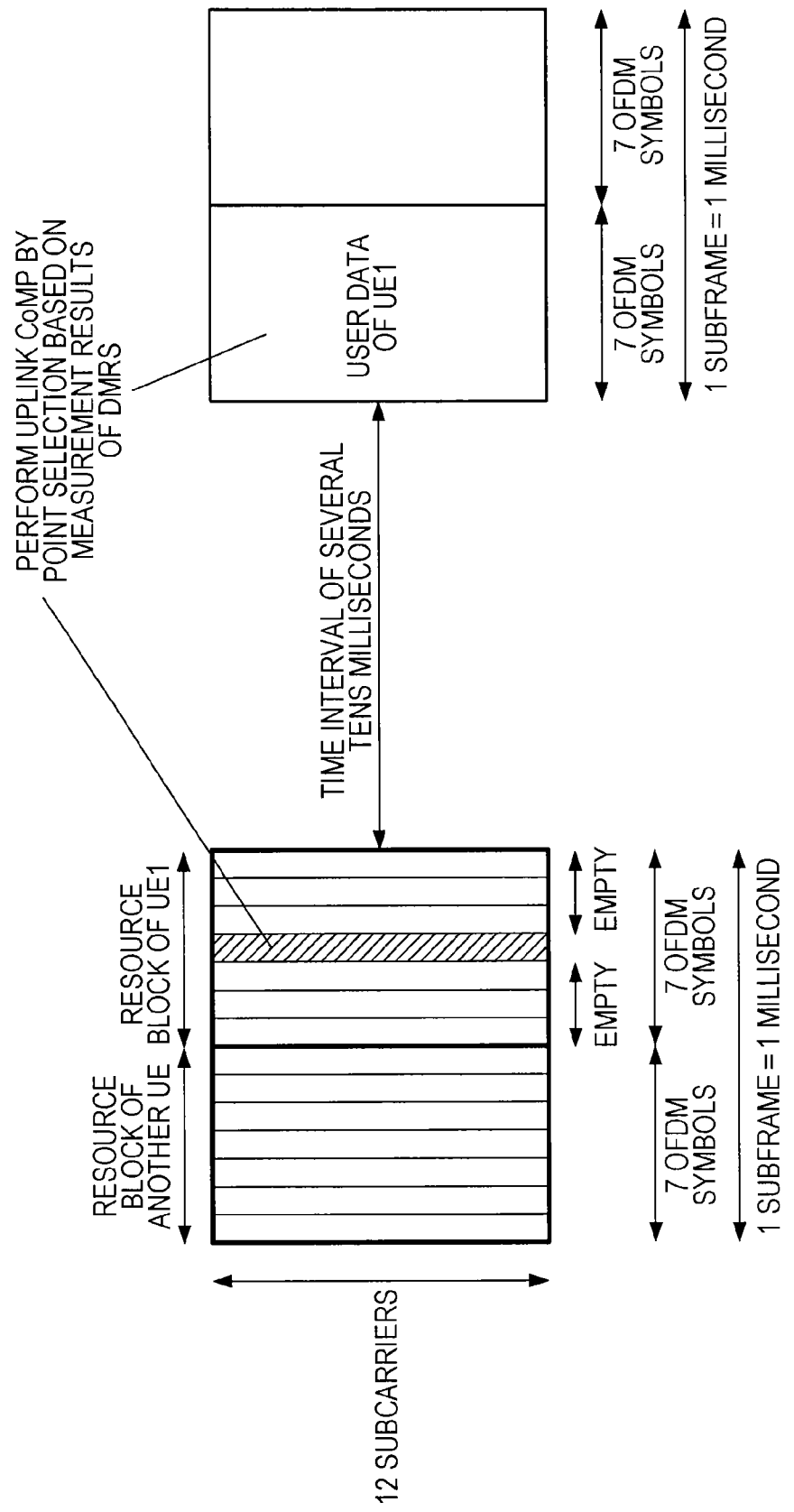
FIG. 5 is a diagram illustrating an example where a time interval is placed between an uplink reference signal and uplink user data.

Moreover, FIG. 5 illustrates an example where a time interval is placed between the uplink reference signal and the uplink user data. In the illustrated example, the terminal UE1 inserts the reference signal DMRS in one OFDM symbol in the resource block allocated to the terminal UE1. The eNodeBs make measurements of the reference signal DMRS. After the above-mentioned time interval, the terminal UE1 transmits a resource block containing information (user data) desired to transmit.

In FIG. 5, the symbols other than the central OFDM symbol in which DMRS has been inserted (a part depicted by oblique lines in the figure) are empty in the first resource block containing the reference signal DMRS. Moreover, within the above time interval, the Serving eNodeB has finished executing uplink CoMP point selection based on the measurement results collected from the cooperating eNodeBs, and the eNodeBs set as the CoMP set perform CoMP reception on the second resource block containing the user data.

DMRS is a reference signal that is originally intended for coherent detection, and is precoded. Accordingly, DMRS cannot be used for the measurement of a channel. In contrast, in the first embodiment, DMRS is transmitted without precoding in order to be used as a reference signal for uplink CoMP point selection. Accordingly, a channel measurement can be made without changing the format.

In LTE, the minimum size of a resource block is 12 subcarriers×7 OFDM symbols. If the UE is a MTC device, transmission data is small. Accordingly, it is considered that a resource block of a smaller size than the minimum size will also do fine. In other words, a resource block of a smaller size is required to reduce power consumption to extremely low. Hence, it is also considered to introduce a resource block whose size in the frequency direction is half, for example, 6 subcarriers×7 OFDM symbols.

Figure 6:
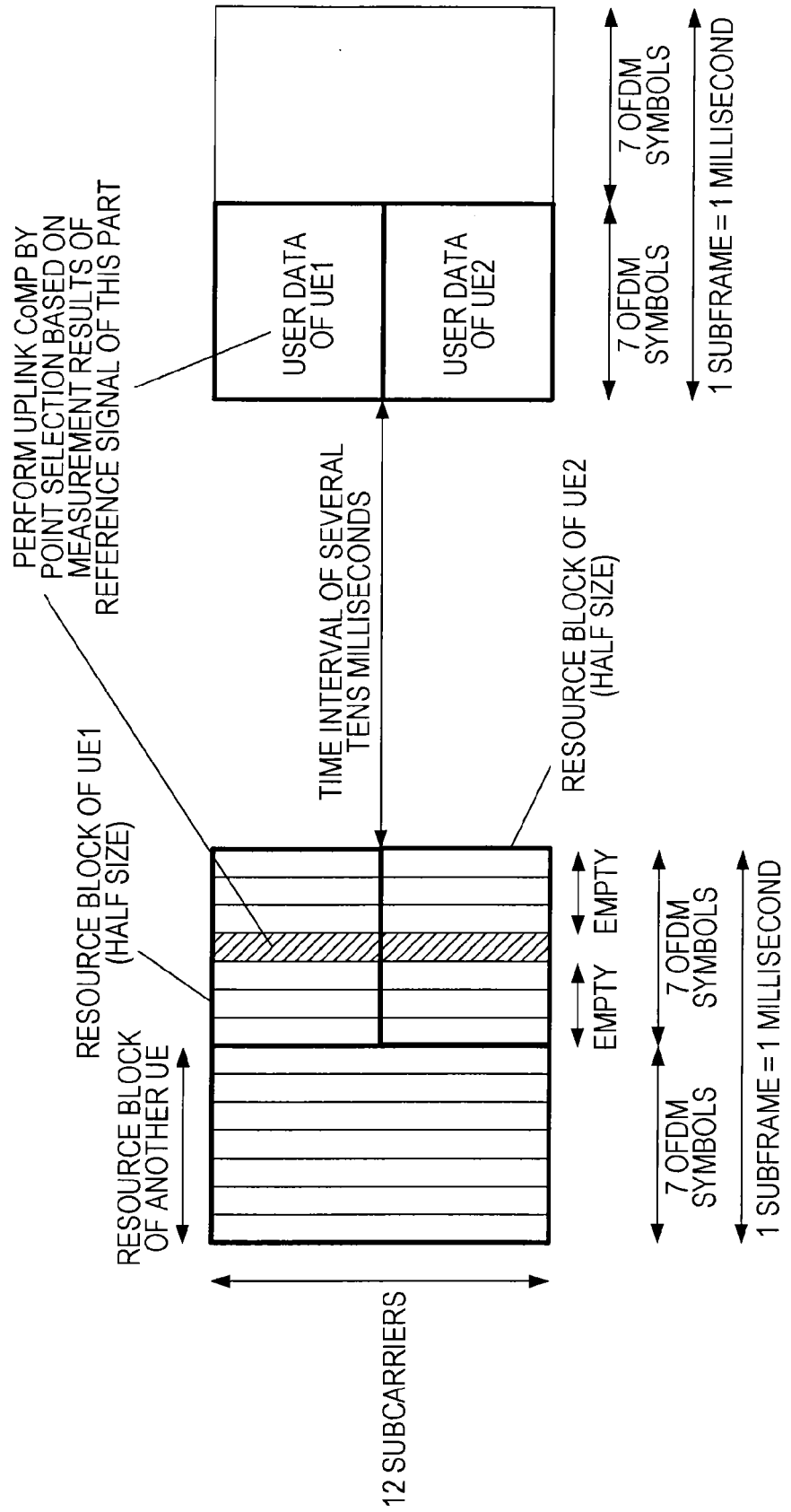
FIG. 6 is a diagram illustrating an example where a time interval is placed between the uplink reference signal and the uplink user data when a small-sized resource block is introduced.

FIG. 6 illustrates a state where when the resource block size of 6 subcarriers×7 OFDM symbols is introduced, a reference signal is inserted in an uplink resource block while uplink user data is transmitted in a resource block spaced in time. In the illustrated example, the reference signal (a part depicted by oblique lines in the figure) of the terminal UE1 is inserted in six subcarriers in an upper half of the band out of the original 12 subcarriers of a resource block, and the terminal UE1 transmits user data using six subcarriers of an upper half of the band of a resource block after several tens milliseconds. Within the time interval of several tens milliseconds, the Serving eNodeB has finished executing uplink CoMP point selection for the terminal UE1 based on the measurement results collected from the cooperating eNodeBs, and the eNodeBs set as the CoMP set perform CoMP reception on the half size resource block containing the user data from the terminal UE1.

Moreover, the reference signal (a part depicted by oblique lines in the figure) of the terminal UE2 is inserted in six subcarriers in a lower half of the band out of the original 12 subcarriers of the resource block, and the terminal UE2 transmits user data using six subcarriers of a lower half of the band of the resource block after several tens milliseconds. Within the time interval of several tens milliseconds, the Serving eNodeB has finished executing uplink CoMP point selection for the terminal UE2 based on the measurement results collected from the cooperating eNodeBs, and the eNodeBs set as the CoMP set perform CoMP reception on the half size resource block containing the user data from the terminal UE2.

Second Embodiment

In the first embodiment, one resource block is fully occupied to transmit a reference signal from one UE (in other words, to measure a channel for one UE), which is inefficient. This is because, as can be seen from FIG. 5, the UE has no alternative but to transmit the reference signal using only one OFDM symbol in a resource block allocated to the UE itself and leave the other OFDM symbols unused.

Figure 7:
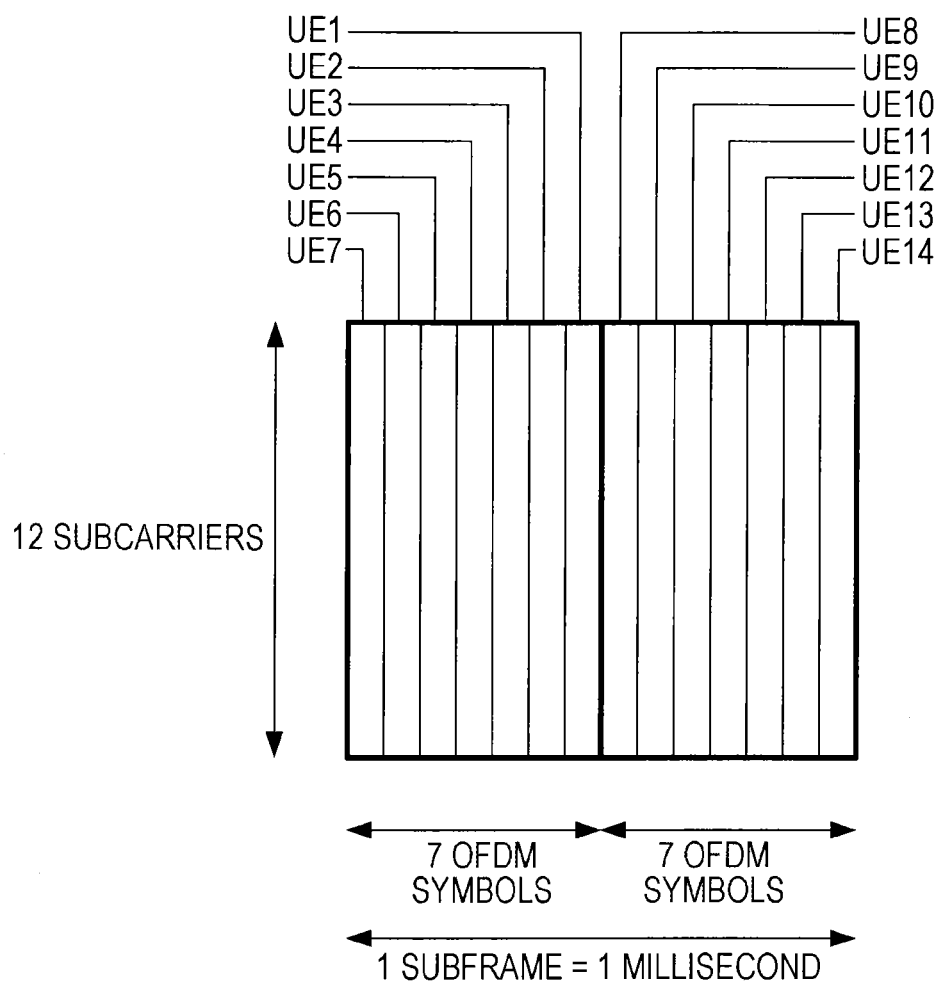
FIG. 7 is a diagram illustrating a state where a plurality of UEs inserts reference signals in one subframe.

In contrast, in the second embodiment, a format in which a plurality of UEs inserts reference signals in one resource block is provided to promote efficiency. FIG. 7 illustrates a state where different UEs (UE1 to UE14) insert reference signals for point selection respectively in the symbols in one subframe including 14 OFDM symbols.

In the known standards of LTE and LTE-Advanced, a resource block is a minimum unit to allocate radio resources, and is occupied by one UE. In other words, signals of a plurality of UEs are not multiplexed in one resource block.

In contrast, in the second embodiment, it is made possible to share one resource block among a plurality of UEs that perform uplink CoMP in order to be used for the transmission of reference signals for uplink CoMP point selection. The applicant proposes a format, different from the known one, that a plurality of UEs shares one resource block as illustrated in FIG. 7 from the viewpoints that a MTC device has a little amount of data to transmit, and requires extremely low power consumption.

In order to receive the reference signal multiplexed by the plurality of UEs in one resource block as illustrated in FIG. 7, an eNodeB reserves in advance a symbol in a resource block in a subframe in a frame to receive the reference signal, between the eNodeB and a UE. The reservation is made by dedicated Signaling.

Moreover, in order to multiplex reference signals in coordination with the other UEs in one resource block and transmit the reference signal, each UE reserves its location of the uplink reference signal (the location of a symbol in the resource block) and reserves in advance a location (resource block) to actually transmit uplink user data.

Figure 8:
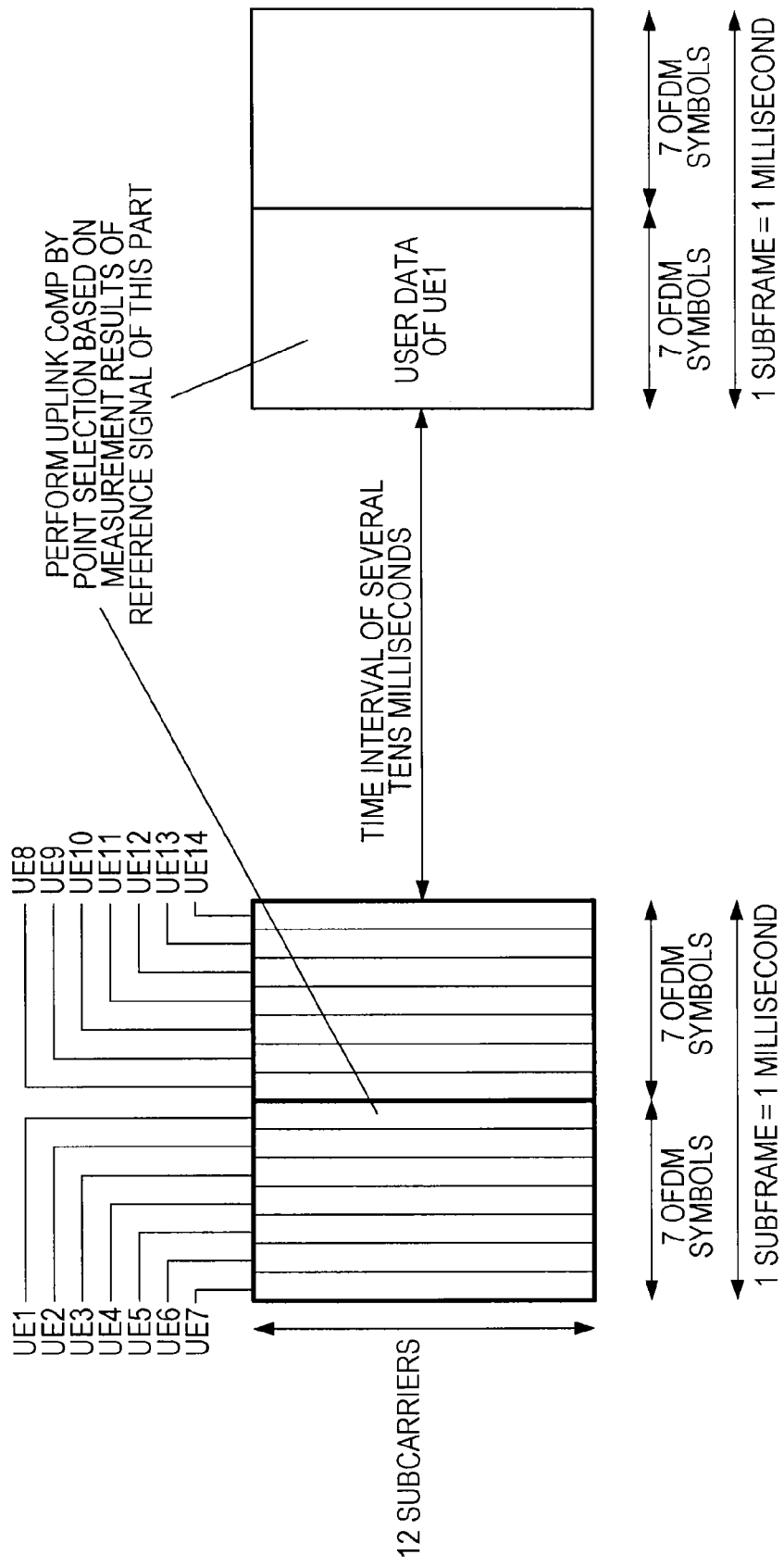
FIG. 8 is a diagram illustrating a state where a UE transmits reference signals in a resource block multiplexed by the plurality of UEs and transmits user data in a subsequent resource block.

FIG. 8 illustrates a state where the terminal UE1 inserts the uplink reference signal in one OFDM symbol in a subframe for the reference signal (the seventh OFDM symbol from the start of the first resource block in the subframe) and transmits user data in a subsequent resource block separated by a time interval of several tens milliseconds. A plurality of eNodeBs that has received the reference signal of UE1 transmits their measurement results to the Serving eNodeB. The Serive eNodeB then decides on eNodeBs to join an uplink CoMP set of UE1 based on the measurement results collected from the cooperating eNodeBs. Upon reception of the user data from UE1, only the eNodeBs joining the CoMP set perform the receiving process.

Figure 9:
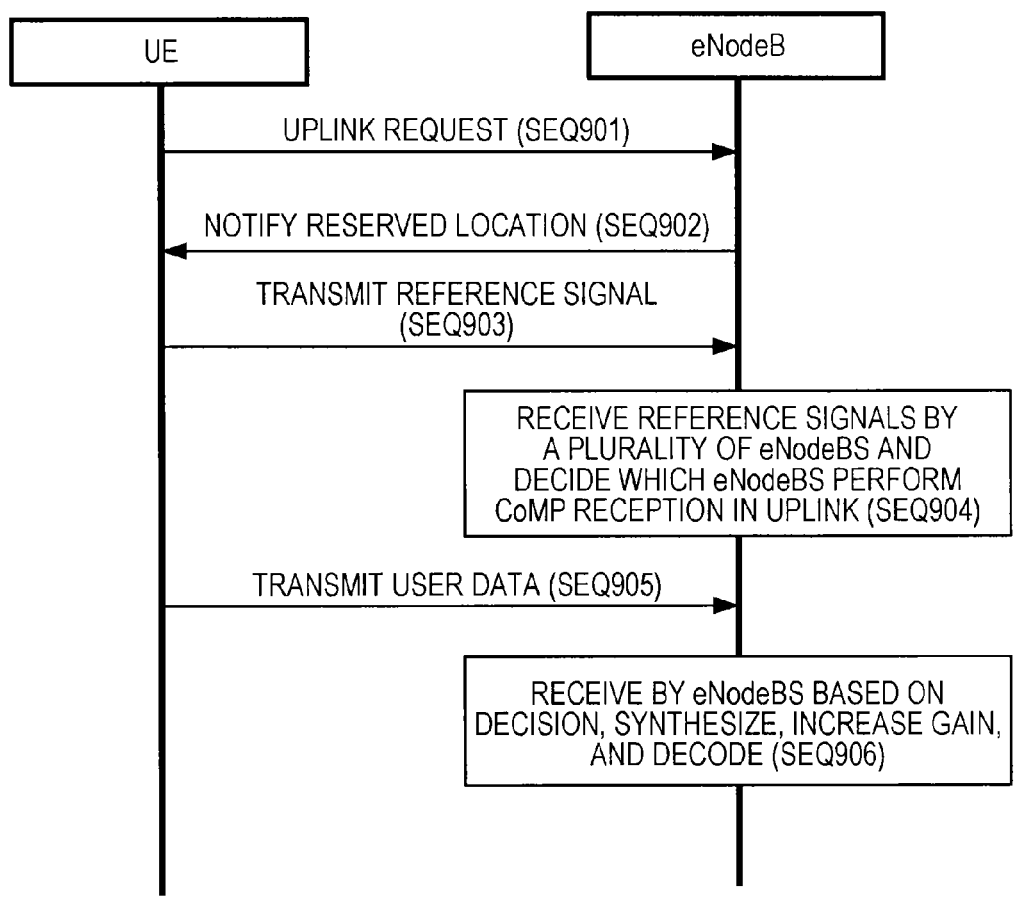
FIG. 9 is a diagram illustrating a communication sequence example for uplink transmission of the reference signal and data from the UE in the format illustrated in FIG. 8.

FIG. 9 illustrates a communication sequence example for uplink transmission of a reference signal and data from a UE in the format illustrated in FIGS. 5 to 8.

The UE makes an uplink request to an eNodeB when transmission data occurs in an upper application (SEQ901).

In contrast, the eNodeB side reserves, for the UE, a location to receive a reference signal for uplink CoMP point selection in a resource block, and notifies the UE of the reserved location (SEQ902).

The UE then inserts the reference signal in the reserved location and transmits the resource block (SEQ903).

A plurality of eNodeBs that has received the reference signal of UE1 transmits their measurement results to a Serving eNodeB. The Serive eNodeB then decides on eNodeBs to join an uplink CoMP set of the UE based on the measurement results collected from the cooperating eNodeBs (SEQ904).

The UE transmits user data in a subsequent resource block separated by a predetermined time interval after the transmission of the reference signal (SEQ905).

The eNodeBs joining the CoMP set receive the user data from the UE. The Serving eNodeB then synthesizes the received signals at the eNodeBs to increase gain, and subsequently performs the decoding process (SEQ906).

In LTE, the minimum size of a resource block is 12 subcarriers×7 OFDM symbols. If the UE is a MTC device, transmission data is small. Accordingly, it is considered that a resource block of a smaller size than the minimum size will also do fine. In other words, a resource block of a smaller size is required to reduce power consumption to extremely low. Hence, it is also considered to introduce a resource block whose size in the frequency direction is half, for example, 6 subcarriers×7 OFDM symbols.

Figure 10:
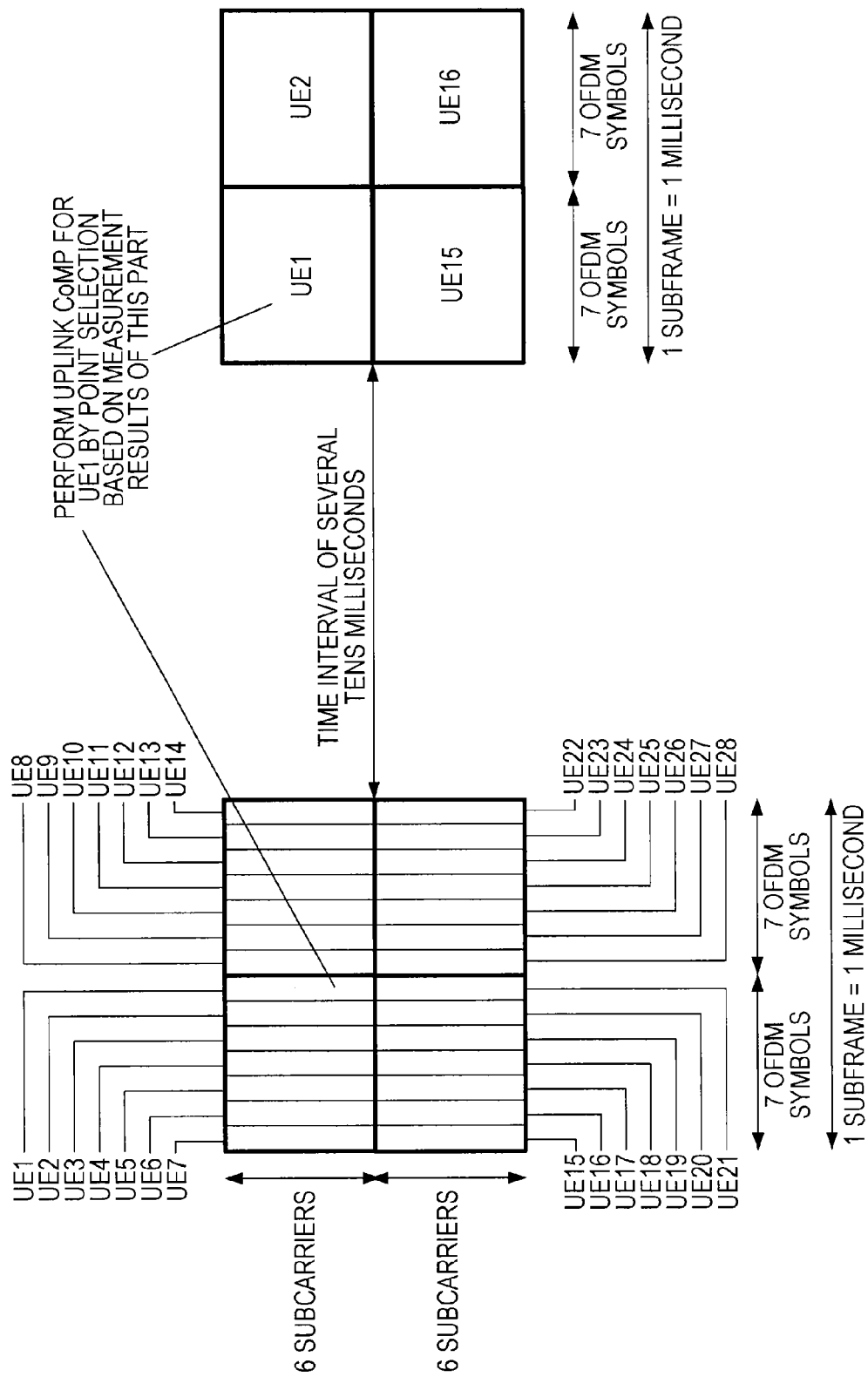
FIG. 10 is a diagram illustrating a state where UEs transmit the reference signals in a resource block multiplexed by a plurality of UEs and transmit user data by a subsequent resource block when a small-sized resource block is introduced.

FIG. 10 illustrates a state of multiplexing reference signals of a plurality of UEs in uplink resource blocks and transmitting uplink user data in resource blocks spaced in time when a resource block size of 6 subcarriers×7 OFDM symbols is introduced. In the illustrated example, the reference signals of the terminals UE1 to UE14 are inserted in six subcarriers in upper halves of the band out of the original 12 subcarriers of resource blocks, and the terminals UE1 and UE2 respectively transmit user data using six subcarriers in upper halves of the band of resource blocks after several tens milliseconds. Within the time interval of several tens milliseconds, the Serving eNodeB has finished executing uplink CoMP point selection for the terminal UE1 based on the measurement results collected from the cooperating eNodeBs, and the eNodeBs set as the CoMP set perform CoMP reception on the half size resource blocks containing the user data from the terminals UE1 and UE2.

Moreover, the reference signals of terminals UE15 to UE28 are inserted in six subcarriers in lower halves of the band out of the original 12 subcarriers of the resource blocks, and the terminals UE15 and UE16 respectively transmit user data using six subcarriers in lower upper halves of the band of the resource blocks after several tens milliseconds. Within the time interval of several tens milliseconds, the Serving eNodeB has finished executing uplink CoMP point selection for the terminal UE1 based on the measurement results collected from the cooperating eNodeBs, and the eNodeBs set as the CoMP set perform CoMP reception on the half size resource blocks containing the user data from the terminals UE15 and UE16.

If it is not possible to detect a reference signal from a UE at a location of a relevant symbol in a resource block in which a plurality of UEs multiplexes and transmits the reference signals, it is also possible to estimate that there is no uplink signal.

Moreover, as a consequence of the resource block estimated to have no uplink signal, and point selection, the relevant resource block of an eNodeB that has been decided not to be used for uplink CoMP reception can be released to another UE.

Apparatus Configuration

Figure 11:
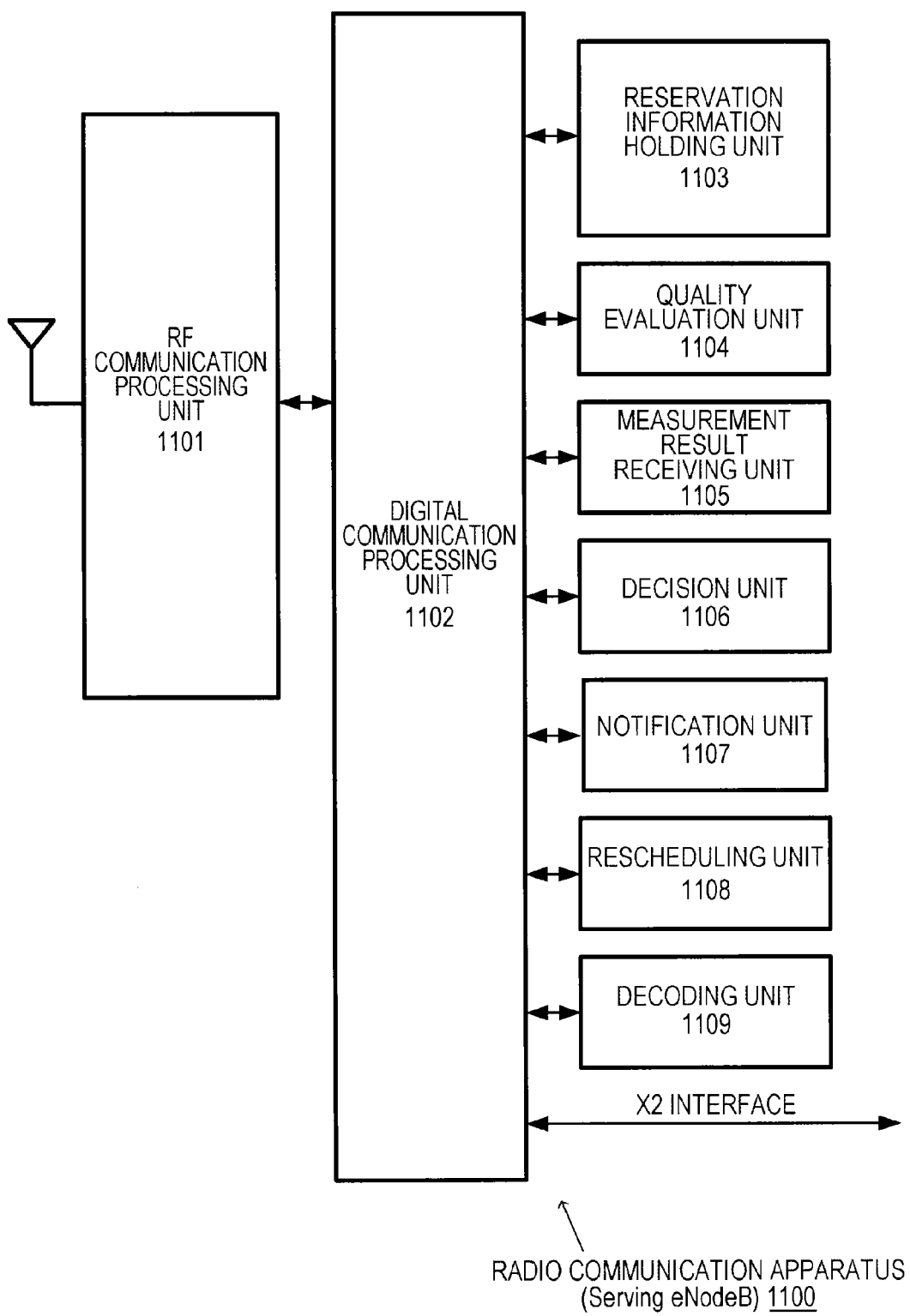
FIG. 11 is a diagram schematically illustrating a functional configuration of a radio communication apparatus 1100 that operates as a Serving eNodeB.

FIG. 11 schematically illustrates a functional configuration of a radio communication apparatus 1100 that operates as the Serving eNodeB in the above-mentioned first or second embodiment. In the figure, the illustrations of functional modules that perform basic operations as the eNodeB are omitted as appropriate.

The radio communication apparatus 1100 includes an RF communication processing unit 1101 that performs an analog process on a radio signal to be transmitted/received by an antenna, and a digital communication processing unit 1102 that performs a modulation process on a transmitted digital signal and a demodulation process on a received digital signal. The digital communication processing unit 1102 exchanges transmission/reception data with an upper layer protocol of a communication layer of the apparatus 1100 itself. Moreover, the digital communication processing unit 1102 communicates with other eNodeBs (such as cooperating eNodeBs) via the X2 interface, S-GW (Serving Gateway), and MME (Mobility Management Entity).

A reservation information holding unit 1103 holds information on locations reserved for each UE to transmit a reference signal for uplink CoMP point selection, and user data (on transmissions in which symbols of which resource blocks of which subframes).

A quality evaluation unit 1104 measures the reference signal received from the UE and evaluates the reception quality of the uplink channel.

A measurement result receiving unit 1105 performs a process to receive the measurement result of the received reference signal via the X2 interface from an eNodeB (cooperating eNodeB) being a candidate for uplink CoMP reception for the UE.

A decision unit 1106 decides on the CoMP set that performs uplink reception in coordination with the radio communication apparatus 1100, that is, performs point selection, for each UE, based on the evaluation result by the quality evaluation unit 1104, and the measurement results of reference signals at the eNodeBs, the measurement results having been received by the measurement result receiving unit 1105.

A notification unit 1107 notifies the other eNodeBs (cooperating eNodeBs) of whether or not to perform uplink CoMP reception, on a UE basis.

A rescheduling unit 1108 schedules, that is, allocates a radio resource in its own cell. As a consequence of point selection by the decision unit 1106, the rescheduling unit 1108 reschedules a radio resource in accordance with whether or not an eNodeB performs CoMP reception in the uplink of the UE. When having decided not to perform CoMP reception for the UE, it is possible to allocate, that is, reschedule a relevant resource block to another UE in its own cell. Rescheduling here corresponds to point blanking of downlink CoMP. In uplink CoMP, it is not point blanking, but rescheduling corresponds to point blanking.

A decoding unit 1109 performs a decoding process on a received signal from the UE. When CoMP reception is performed in the uplink from the UE, the decoding unit 1109 collects user data received through CoMP by the eNodeBs (cooperating eNodeBs) via the X2 interface, synthesizes the user data to increase gain, and decodes the user data.

Figure 12:
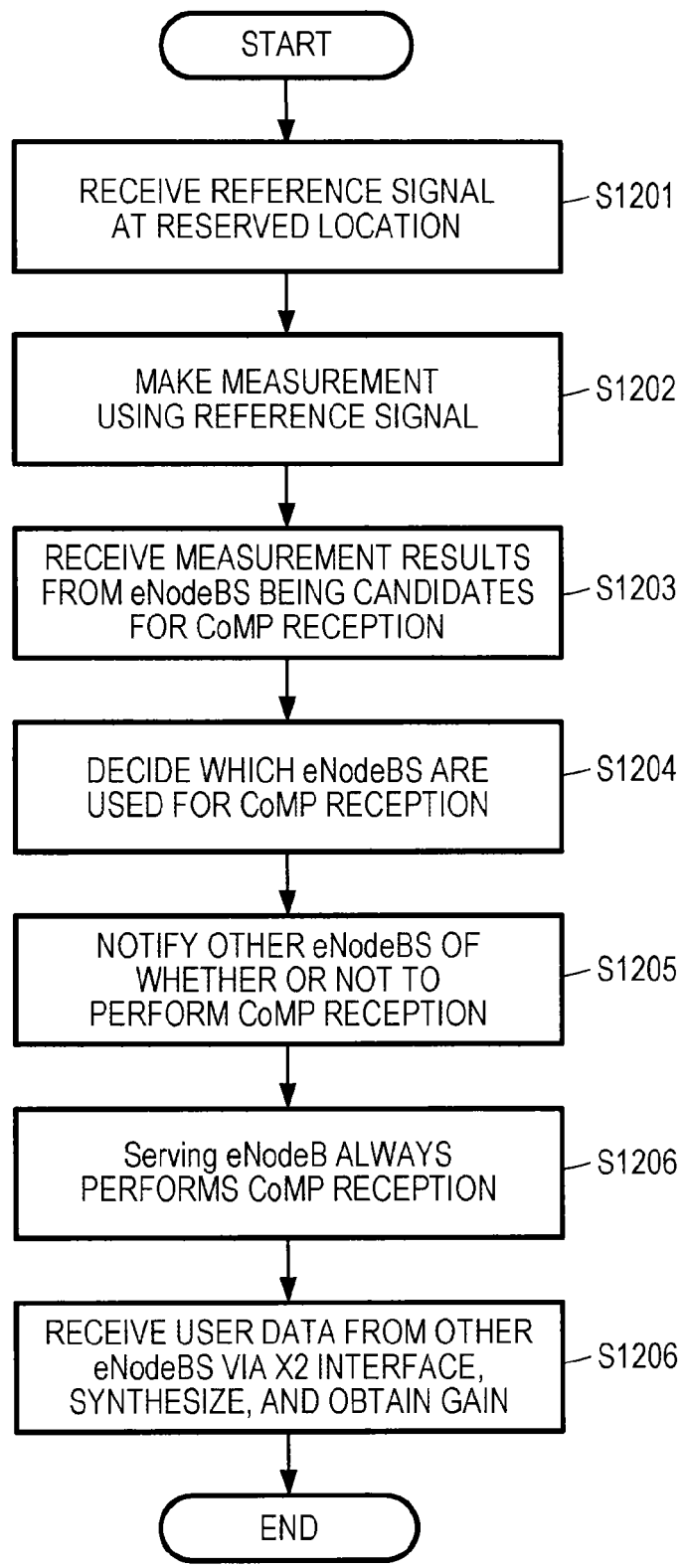
FIG. 12 is a flowchart illustrating a processing procedure to be executed by the Serving eNodeB.

FIG. 12 illustrates in a flowchart format a processing procedure to be executed when the radio communication apparatus 1100 illustrated in FIG. 11 operates as the Serving eNodeB.

Firstly, the Serving eNodeB receives a reference signal for uplink CoMP point selection, the reference signal having been transmitted by a UE, at a reserved location (an OFDM symbol reserved for reception in a relevant resource block) (step S1201).

Next, the Serving eNodeB measures the received reference signal, and acquires the state of the uplink channel from the UE (step S1202).

Moreover, the Serving eNodeB receives the measurement results of the reference signal via the X2 interface from eNodeBs (cooperating eNodeBs) being candidates for CoMP reception in the uplink of the UE (step S1203).

The Serving eNodeB then decides on eNodeBs that perform CoMP reception in the uplink of the UE based on point selection, in other words, the measurement results of the reference signal at the eNodeBs (step S1204). The Serving eNodeB is assumed to make a decision in such a manner as to always include the Serving eNodeB itself in the uplink CoMP set.

Next, the Serving eNodeB notifies the other eNodeBs (cooperating eNodeBs) of whether or not to perform CoMP reception in the uplink of the UE (step S1205).

A resource block separated by a predetermined time interval after the transmission of the reference signal is reserved for the UE. The UE transmits user data using this resource block. The Serving eNodeB always performs CoMP reception on the user data (step S1206).

The Serving eNodeB then collects the user data received through CoMP by the eNodeBs (cooperating eNodeBs) via the X2 interface, synthesizes the user data to increase gain, and decodes the user data (step S1207).

Figure 13:
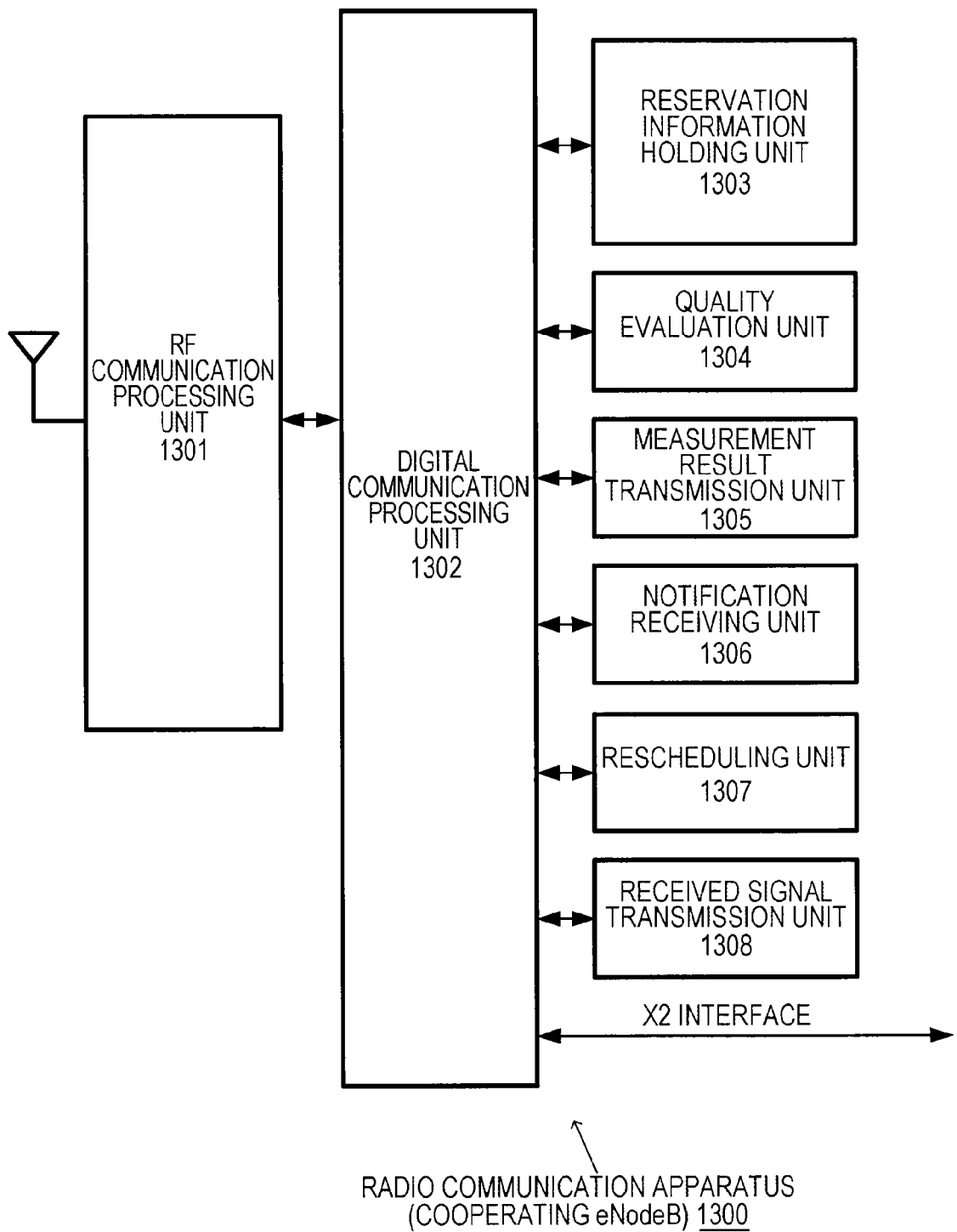
FIG. 13 is a diagram schematically illustrating a functional configuration of a radio communication apparatus 1300 that operates as a cooperating eNodeB.

Moreover, FIG. 13 schematically illustrates a functional configuration of a radio communication apparatus 1200 that can operate as the cooperating eNodeB in the above-mentioned first or second embodiment. In the figure, the illustrations of functional modules that perform basic operations as the eNodeB are omitted as appropriate.

A radio communication apparatus 1300 includes an RF communication processing unit 1301 that performs an analog process on a radio signal to be transmitted/received by an antenna, and a digital communication processing unit 1302 that performs a modulation process on a transmitted digital signal and a demodulation process on a received digital signal. The digital communication processing unit 1302 exchanges transmission/reception data with an upper layer protocol of a communication layer of the apparatus 1300 itself. Moreover, the digital communication processing unit 1302 communicates with the Serving eNodeB via the X2 interface, S-GW (Serving Gateway), and MME (Mobility Management Entity).

A reservation information holding unit 1303 holds information on locations reserved for each UE to transmit a reference signal for uplink CoMP point selection, and user data (on transmissions in which symbols of which resource blocks of which subframes).

A quality evaluation unit 1304 measures the reference signal received from the UE and evaluates the reception quality of the uplink channel. Moreover, a measurement result transmission unit 1305 transmits the result of measuring the reference signal by the quality evaluation unit 1304 to the Serving eNodeB via the X2 interface.

As described above, the Serving eNodeB side decides on eNodeBs that perform CoMP reception in the uplink of each UE based on point selection, in other words, the measurement results of the reference signal at the eNodeBs, and notifies other eNodeBs (cooperating eNodeBs) of whether or not to perform uplink CoMP reception on a UE basis. A notification receiving unit 1306 receives, from the Serving eNodeB, the notification of whether or not it performs uplink CoMP reception on a UE basis.

A rescheduling unit 1307 schedules, that is, allocates a radio resource in its own cell in accordance with the result of point selection received from the Serving eNodeB, in other words, the notification of whether or not it performs CoMP reception in the uplink of the UE. When it has been decided that the eNodeB does not perform CoMP reception (in other words, not join the CoMP set), the eNodeB can allocate, that is, reschedule a relevant resource block to another UE in its own cell. Rescheduling here corresponds to point blanking of downlink CoMP. In uplink CoMP, it is not point blanking, but rescheduling corresponds to point blanking.

A received signal transmission unit 1308 transmits user data received from the UE that has been decided to perform CoMP reception in the uplink, to the Serving eNodeB via the X2 interface.

Figure 14:
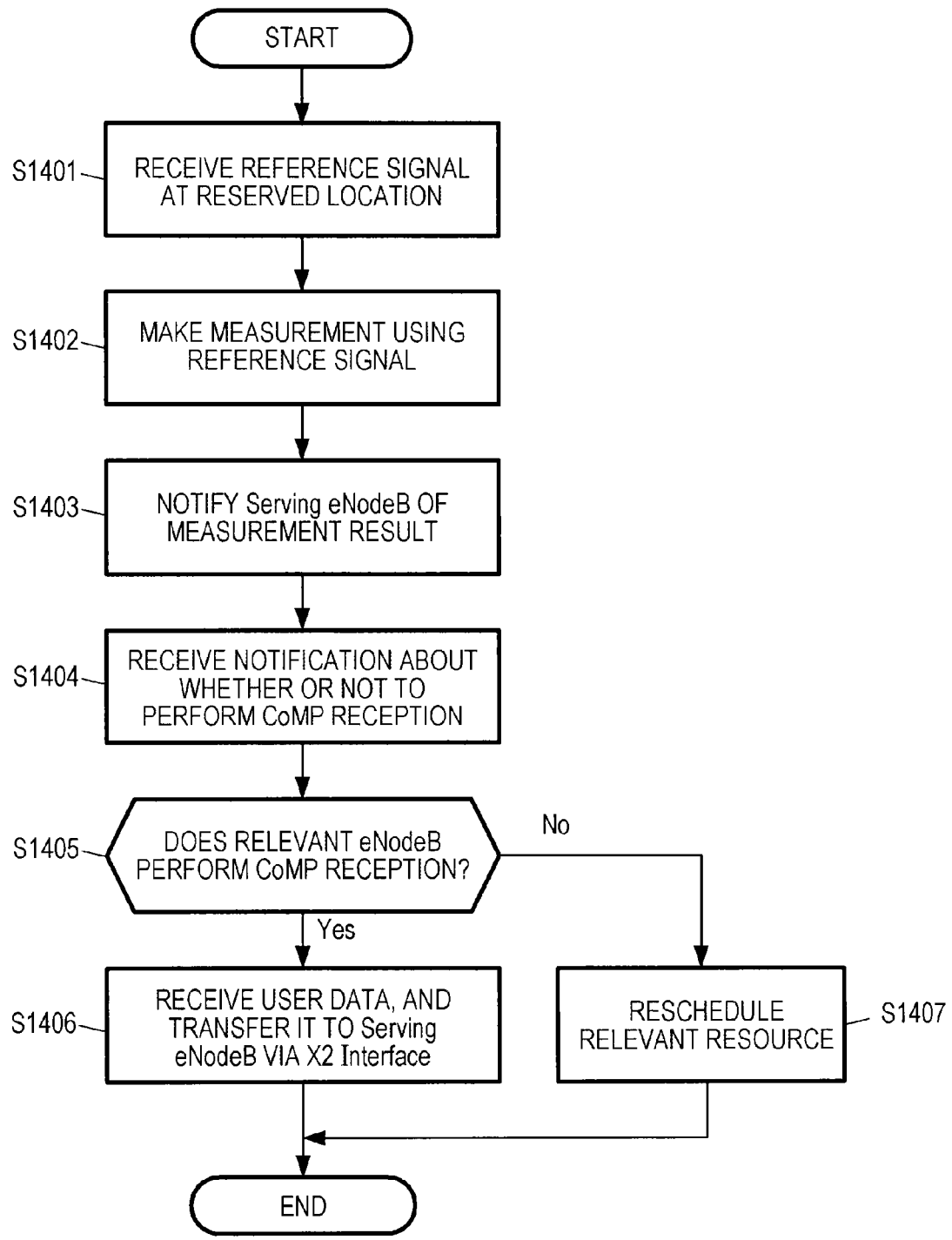
FIG. 14 is a flowchart illustrating a processing procedure to be executed by the cooperating eNodeB.

FIG. 14 illustrates in a flowchart format a processing procedure to be executed when the radio communication apparatus 1300 illustrated in FIG. 13 operates as the cooperating eNodeB.

Firstly, the cooperating eNodeB receives a reference signal for uplink CoMP point selection, the reference signal having been transmitted by a UE, at a reserved location (an OFDM symbol reserved for reception in a relevant resource block) (step S1401).

Next, the cooperating eNodeB measures the received reference signal, and acquires the state of the uplink channel from the UE (step S1402).

Next, the cooperating eNodeB transmits the measurement result of the reference signal to the Serving eNodeB via the X2 interface (step S1403).

The cooperating eNodeB subsequently receives a notification of whether or not it performs CoMP reception in the uplink of the UE, from the Serving eNodeB via the X2 interface (step S1404). The cooperating eNodeB then analyzes the content of the notification and checks whether or not it performs CoMP reception (step S1405).

If having received the notification that it performs CoMP reception (Yes in step S1405), the cooperating eNodeB receives user data from the UE in a resource block separated by the predetermined time interval after the reference signal. The cooperating eNodeB then transmits the received user data to the Serving eNodeB via the X2 interface (step S1406).

On the other hand, if having received the notification that it does not perform CoMP reception (No in step S1405), the cooperating eNodeB allocates, that is, reschedules the relevant resource block to another UE in its own cell (step S1407).

Figure 15:
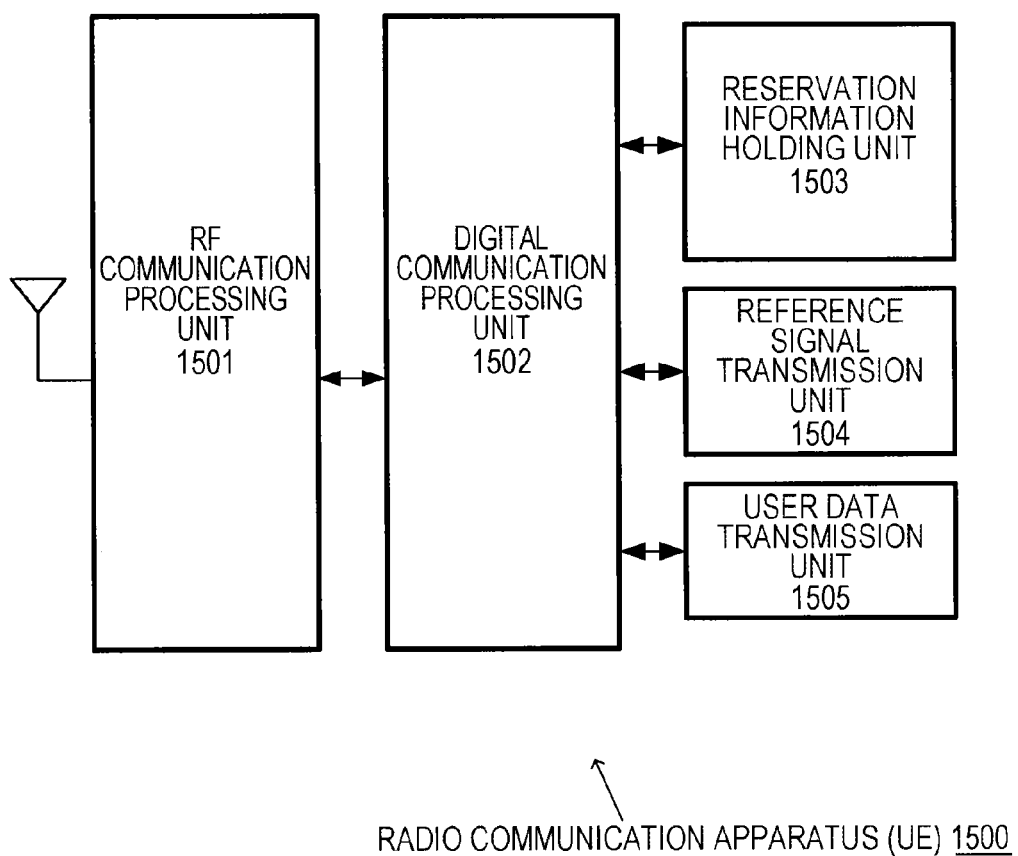
FIG. 15 is a diagram schematically illustrating a functional configuration of a radio communication apparatus 1500 that operates as a UE.

FIG. 15 schematically illustrates a functional configuration of a radio communication apparatus 1500 that can operate as the UE in the above-mentioned first or second embodiment. In the figure, the illustrations of functional modules that perform basic operations as the UE are omitted as appropriate.

The radio communication apparatus 1500 includes an RF communication processing unit 1501 that performs an analog process on a radio signal to be transmitted/received by an antenna, and a digital communication processing unit 1502 that performs a modulation process on a transmitted digital signal and a demodulation process on a received digital signal. The digital communication processing unit 1502 exchanges transmission/reception data with an upper layer protocol of a communication layer of the apparatus 1500 itself.

A reservation information holding unit 1503 holds information on locations reserved for each UE to transmit a reference signal for uplink CoMP point selection, and user data (on transmissions in which symbols of which resource blocks of which subframes).

A reference signal transmission unit 1504 transmits the reference signal at a reserved location in a resource block where it transmits the reference signal via the digital communication processing unit 1502 and the RF communication processing unit 1501 in accordance with the reservation information held by the reservation information holding unit 1503.

A user data transmission unit 1505 uses a resource block where it transmits user data in accordance with the reservation information held in the reservation information holding unit 1503 to transmit the user data via the digital communication processing unit 1502 and the RF communication processing unit 1501.

According to the technology disclosed in the present description, the Serving eNodeB can perform accurate point selection based on the measurement results of the reference signal from a UE such as a MTC device and decide on an uplink CoMP set. As a consequence, it is possible to reduce electric power consumed upon uplink communication of the MTC device, extend a period of time during which battery change is not required, and reduce the operating cost.

The technology disclosed in the present description can be configured as follows:

(1) A radio communication apparatus to operate as a terminal station, the radio communication apparatus including:
a reference signal transmission unit for transmitting a reference signal to be measured to decide on a coordinating group of base stations that perform coordinated multi point reception, using a first radio resource allocated to the radio communication apparatus; and
a user data transmission unit for transmitting user data using a second radio resource allocated to the radio communication apparatus, the second radio resource being separated by a predetermined time interval from the first radio resource.

(2) The radio communication apparatus according to (1), wherein the first and second radio resources are reserved in between with at least one base station that performs coordinated multi point reception.

(3) The radio communication apparatus according to (1), wherein there is a sufficient time interval between the first and second radio resources to decide on the coordinating group based on results of measuring, at base stations, the reference signal from the reference signal transmission unit.

(4) The radio communication apparatus according to (1), wherein the reference signal transmission unit transmits the reference signal that is not precoded.

(5) The radio communication apparatus according to (1), wherein the reference signal transmission unit transmits the reference signal using a time domain of a part of the first radio resource.

(6) The radio communication apparatus according to (1), wherein the reference signal transmission unit transmits the reference signal using a frequency domain of a part of the first radio resource.

(7) The radio communication apparatus according to (1), wherein the reference signal transmission unit transmits the reference signal multiplexed in coordination with other terminal stations in at least one of time and frequency directions in the first radio resource.

(8) A radio communication apparatus to operate as a base station, the radio communication apparatus including:
a quality evaluation unit for measuring a reference signal transmitted from a terminal station using a first radio resource, and evaluating the quality of a channel;
a measurement result receiving unit for receiving measurement results of the reference signal at other base stations being candidates for a coordinating group that performs coordinated multi point reception for the terminal station;
a decision unit for deciding on base stations to form the coordinating group from the other candidate base stations based on the measurement results received by the measurement result receiving unit; and
a decoding unit for synthesizing received signals by the coordinating group, the signals being user data transmitted by the terminal station in a second radio resource separated by a predetermined time interval from the first radio resource.

(9) The radio communication apparatus according to (8), further including a rescheduling unit for reallocating a radio resource in a cell of the radio communication apparatus upon having decided not to perform coordinated multipoint reception for the terminal station.

(10) The radio communication apparatus according to (8), wherein the first and second radio resources are reserved between the radio communication apparatus and the terminal station.

(11) The radio communication apparatus according to (8), wherein there is a sufficient time interval between the first and second radio resources to decide on the coordinating group based on results of measuring, at base stations, the reference signal from the reference signal transmission unit.

(12) The radio communication apparatus according to (8), wherein the decision unit decides on base stations to form the coordinating group based on the measurement results of the reference signal transmitted using a time domain of a part of the first radio resource.

(13) The radio communication apparatus according to (8), wherein the decision unit decides on base stations to form the coordinating group based on the measurement results of the reference signal transmitted using a frequency domain of a part of the first radio resource.

(14) The radio communication apparatus according to (8), wherein the decision unit decides on base stations to form the coordinating group based on the measurement results of the reference signal multiplexed in coordination with other terminal stations in at least one of time and frequency directions in the first radio resource.

(15) A radio communication apparatus to operate as a base station, the radio communication apparatus including:

a quality evaluation unit for measuring a reference signal transmitted from a terminal station using a first radio resource, and evaluating the quality of a channel;

a measurement result transmission unit for transmitting the measurement result by the quality evaluation unit to a serving base station to decide on base stations to form a coordinating group that performs coordinated multi point reception for the terminal station; and a received signal transmission unit for upon having been decided by the serving base station that the radio communication apparatus joins the coordinating group, transmitting, to the serving base station, a received signal of user data transmitted by the terminal station in a second radio resource separated by a predetermined time interval from the first radio resource.

(16) The radio communication apparatus according to (15), further including a rescheduling unit for reallocating a radio resource in a cell of the radio communication apparatus upon having been decided that the radio communication apparatus does not join the coordinating group.

(17) The radio communication apparatus according to (15), wherein the first and second radio resources are reserved between the serving base station and the terminal station.

(18) The radio communication apparatus according to (15), wherein there is a sufficient time interval between the first and second radio resources to decide on the coordinating group based on results of measuring, at base stations, the reference signal from the reference signal transmission unit.

(19) The radio communication apparatus according to (15), wherein the quality evaluation unit measures the reference signal transmitted using a time domain of a part of the first radio resource, and evaluates the quality of the channel.

(20) The radio communication apparatus according to (15), wherein the quality evaluation unit measures the reference signal transmitted using a frequency domain of a part of the first radio resource, and evaluates the quality of the channel.

(21) The radio communication apparatus according to (15), wherein the quality evaluation unit measures the reference signal multiplexed in coordination with other terminal stations in at least one of time and frequency directions in the first radio resource, and evaluates the quality of the channel.

(22) A radio communication method to operate as a terminal station, the radio communication method including:

a reference signal transmission step of transmitting a reference signal to be measured to decide on a coordinating group of base stations that perform coordinated multi point reception, using a first radio resource allocated to the terminal station; and a user data transmission step of transmitting user data using a second radio resource allocated to the terminal station, the second radio resource being separated by a predetermined time interval from the first radio resource.

(23) A radio communication method to operate as a base station, the radio communication method including:

a quality evaluation step of measuring a reference signal transmitted from a terminal station using a first radio resource, and evaluating the quality of a channel;

a measurement result receiving step of receiving measurement results of the reference signal at other base stations being candidates that perform coordinated multipoint reception for the terminal station;

a decision step of deciding on base stations to form a coordinating group that performs coordinated multi point reception for the terminal station in coordination with the base station from the other candidate base stations based on the measurement results received in the measurement result receiving step; and a decoding step of synthesizing received signals by the coordinating group, the signals being user data transmitted by the terminal station in a second radio resource separated by a predetermined time interval from the first radio resource.

(24) A radio communication method to operate as a base station, the radio communication method including:

a quality evaluation step of measuring a reference signal transmitted from a terminal station using a first radio resource, and evaluating the quality of a channel;

a measurement result transmission step of transmitting the measurement result in the quality evaluation step to a serving base station to decide on base stations to form a coordinating group that performs coordinated multi point reception for the terminal station; and a received signal transmission step of upon having been decided by the serving base station that the base station joins the coordinating group, transmitting, to the serving base station, a received signal of user data transmitted by the terminal station in a second radio resource separated by a predetermined time interval from the first radio resource.

(25) A radio communication system including:

a terminal station for transmitting a reference signal using a first radio resource, and transmitting user data using a second radio resource separated by a predetermined time interval from the first radio resource; and a plurality of base stations for each measuring the reference signal and forming a coordinating group based on the measurement results of the reference signal to perform coordinated multi point reception on the user data.

INDUSTRIAL APPLICABILITY

Up to this point the technology disclosed in the present description has been explained in detail with reference to the specific embodiments. However, it is obvious that those skilled in the art can modify or substitute for the embodiments within a scope that does not depart from the spirit of the technology disclosed in the present description.

In the present description, the explanation has been given concentrating on the embodiments applied to a cellular communication system pursuant to LTE developed by 3GPP. However, the spirit of the technology disclosed in the present description is not limited to them. The technology disclosed in the present description can be similarly applied to various cellular communication systems to which the technology is applied where a plurality of base stations transmits and receives data simultaneously to and from a terminal in coordination.

Moreover, in the present description, the embodiments of the technology disclosed in the present description have been explained focusing on the problems occurring when performing uplink point selection in the FDD mode. However, naturally, the technology disclosed in the present description can be similarly applied also to a communication system in the TDD mode.

Moreover, in the present description, the explanation has been given of the embodiments in which uplink CoMP point selection is performed for a MTC device from the viewpoint of requesting extremely low power consumption. However, naturally, the technology disclosed in the present description can be similarly applied also to a communication system in which a general UE, other than the MTC device, operates. In the detailed description of the invention, it can be similarly achieved even if a "MTC device" is replaced with a "UE".

In short, the technology disclosed in the present description has been explained in the form of illustration, and the described content of the present description should not be interpreted in a limited manner. The claims should be taken into account to judge the spirit of the technology disclosed in the present description.

REFERENCE SIGNS LIST

1100 Radio communication apparatus (Serving eNodeB)
1101 RF communication processing unit
1102 Digital communication processing unit
1103 Reservation information holding unit
1104 Quality evaluation unit
1105 Measurement result receiving unit
1106 Decision unit
1107 Notification unit
1108 Rescheduling unit
1109 Decoding unit
1300 Radio communication apparatus (cooperating eNodeB)
1301 RF communication processing unit
1302 Digital communication processing unit
1303 Reservation information holding unit
1304 Quality evaluation unit
1305 Measurement result transmission unit
1306 Notification receiving unit
1307 Rescheduling unit
1308 Received signal transmission unit
1500 Radio communication apparatus (UE)
1501 RF communication processing unit
1502 Digital communication processing unit
1503 Reservation information holding unit
1504 Reference signal transmission unit
1505 User data transmission unit

The invention claimed is:

1. A radio communication apparatus to operate as a terminal station, the radio communication apparatus comprising:
a reference signal transmission unit configured to transmit a reference signal to be measured by at least one of a plurality of base stations to decide on a coordinating group of base stations, from among the plurality of base stations, for coordinated multi point reception, by a first radio resource allocated to the radio communication apparatus for communication with at least one base station of the coordinating group of base stations; and
a user data transmission unit configured to transmit user data by a second radio resource allocated to the radio communication apparatus,
wherein a time interval based on the measured reference signal is placed between the transmission of the reference signal and the transmission of the user data; and
wherein the first radio resource and the second radio resource are reserved with the at least one base station of the coordinating group of base stations for the coordinated multi point reception.

2. The radio communication apparatus according to claim 1, wherein the reference signal transmission unit is further configured to transmit the reference signal other than a reference signal that is precoded.

3. The radio communication apparatus according to claim 1, wherein the reference signal transmission unit is further configured to transmit the reference signal by a time domain of a part of the first radio resource.

4. The radio communication apparatus according to claim 1, wherein the reference signal transmission unit is further configured to transmit the reference signal by a frequency domain of a part of the first radio resource.

5. The radio communication apparatus according to claim 1, wherein the reference signal transmission unit is further configured to transmit the reference signal multiplexed in coordination with terminal stations other than the terminal station in at least one of time or frequency directions in the first radio resource.

6. A radio communication apparatus to operate as a base station, the radio communication apparatus comprising:
a quality evaluation unit configured to:
    measure a reference signal transmitted from a terminal station by a first radio resource allocated to the terminal station for communication with at least one base station of a coordinating group of base stations, and
    evaluate quality of a channel;
a measurement result receiving unit configured to receive measurement results of the reference signal at a plurality of base stations, wherein the plurality of base stations are candidates for the coordinating group of base stations for coordinated multi point reception for the terminal station;
a decision unit configured to decide base stations to form the coordinating group of base stations from the plurality of base stations based on the measurement results received by the measurement result receiving unit; and
a decoding unit configured to synthesize received user data by the coordinating group of base stations, wherein the user data is transmitted by the terminal station by a second radio resource,
wherein a time interval based on the measured reference signal is placed between the transmission of the reference signal and the transmission of the user data; and
wherein the first radio resource and the second radio resource are reserved between the terminal station and the at least one base station of a coordinating group of base stations.

7. The radio communication apparatus according to claim 6, further comprising a rescheduling unit configured to reallocate a radio resource in a cell of the radio communication apparatus based on a decision whether to perform coordinated multi point reception for the terminal station.

8. The radio communication apparatus according to claim 6, wherein the decision unit is further configured to decide on base stations to form the coordinating group of base stations based on the measurement results of the reference signal transmitted by a time domain of a part of the first radio resource.

9. The radio communication apparatus according to claim 6, wherein the decision unit is further configured to decide on base stations to form the coordinating group of base stations based on the measurement results of the reference signal transmitted by a frequency domain of a part of the first radio resource.

10. The radio communication apparatus according to claim 6, wherein the decision unit is further configured to decide on base stations to form the coordinating group of base stations based on the measurement results of the reference signal multiplexed in coordination with terminal stations other than the terminal station in at least one of time or frequency directions in the first radio resource.

11. A radio communication apparatus to operate as a base station, the radio communication apparatus comprising:
a quality evaluation unit configured to:
measure a reference signal transmitted from a terminal station by a first radio resource allocated to the terminal station for communication with at least one base station of a coordinating group of base stations, and
evaluate quality of a channel;
a measurement result transmission unit configured to transmit the measurement result by the quality evaluation unit to a serving base station, wherein the serving base station is configured to decide on base stations to form the coordinating group of base stations from a plurality of base stations for coordinated multi point reception for the terminal station; and
a received signal transmission unit configured to transmit, based on a decision-by the serving base station that the radio communication apparatus joins the coordinating group of base stations, to the serving base station, user data transmitted by the terminal station by a second radio resource,
wherein a time interval based on the measured reference signal is placed between the transmission of the reference signal and the transmission of the user data; and
wherein the first radio resource and the second radio resource are reserved between the serving base station and the terminal station.

12. The radio communication apparatus according to claim 11, further comprising a rescheduling unit configured to reallocate a radio resource in a cell of the radio communication apparatus based on a decision whether the radio communication apparatus joins the coordinating group.

13. The radio communication apparatus according to claim 11, wherein the quality evaluation unit is further configured to:
measure the reference signal transmitted by a time domain of a part of the first radio resource, and
evaluate the quality of the channel.

14. The radio communication apparatus according to claim 11, wherein the quality evaluation unit is further configured to:
measure the reference signal transmitted by a frequency domain of a part of the first radio resource, and
evaluate the quality of the channel.

15. The radio communication apparatus according to claim 11, wherein the quality evaluation unit is further configured to:
measure the reference signal multiplexed in coordination with terminal stations other than the terminal station in at least one of time or frequency directions in the first radio resource, and
evaluate the quality of the channel.

16. A radio communication method to operate as a terminal station, the radio communication method comprising:
transmitting a reference signal be measured by at least one of a plurality of base stations to decide on a coordinating group of base stations, from among a plurality of base stations, for coordinated multi point reception, by a first radio resource allocated to the terminal station for communication with at least one base station of the coordinating group of base stations; and
transmitting user data by a second radio resource allocated to the terminal station,
wherein a time interval based on the measured reference signal is placed between the transmission of the reference signal and the transmission of the user data; and
wherein the first radio resource and the second radio resource are reserved between the terminal station, and the at least one base station of the coordinating group of base stations.

17. A radio communication method to operate as a base station, the radio communication method comprising:
measuring a reference signal transmitted from a terminal station using a first radio resource allocated to the terminal station for communication with at least one base station of a coordinating group of base stations;
evaluating quality of a channel;
receiving measurement results of the reference signal at a plurality of base stations being candidates for coordinated multi point reception for the terminal station;
deciding on base stations to form a coordinating group of base stations from the plurality of base stations for coordinated multi point reception for the terminal station in coordination with the base station based on the received measurement results; and
synthesizing received user data by the coordinating group of base stations, the user data being transmitted by the terminal station using a second radio resource
wherein a time interval based on the measured reference signal is placed between the transmission of the reference signal and the transmission of the user data; and
wherein the first radio resource and the second radio resource are reserved between the terminal station and the at least one base station of the coordinating group of base stations.

18. A radio communication method to operate as a base station, the radio communication method comprising:
measuring a reference signal transmitted from a terminal station using a first radio resource allocated to the terminal station for communication with at least one base station of a coordinating group of base stations;
evaluating quality of a channel;
transmitting the measurement result to a serving base station to decide on base stations to form the coordinating group base stations from a plurality of base stations for coordinated multi point reception for the terminal station; and transmitting, upon having been decided by the serving base station that the base station joins the coordinating group of base stations, to the serving base station, user data transmitted by the terminal station using a second radio resource, wherein a time interval based on the measured reference signal is placed between the transmission of the reference signal and the transmission of the user data; and wherein the first radio resource and the second radio resource are reserved between the terminal station and the serving base station.

19. A radio communication system, comprising:

a terminal station configured to transmit a reference signal by a first radio resource allocated to the terminal station for communication with at least one base station of a coordinating group of base stations, and transmit user data by a second radio resource; and a plurality of base stations each configured to measure the reference signal and form the coordinating group of base stations based on the measurement results of the reference signal for coordinated multi point reception of the user data, wherein a time interval based on the measured reference signal is placed between the transmission of the reference signal and the transmission of the user data; and wherein the first radio resource and the second radio resource are reserved between the terminal station and the at least one base station of the coordinating group of base stations.

* * * * *